United States Patent [19]

Young et al.

[11] Patent Number: 5,580,306
[45] Date of Patent: Dec. 3, 1996

[54] LOIN SEPARATION APPARATUS AND METHOD OF OPERATION THEREFOR

[75] Inventors: William D. Young, Albert Lea; Eric S. VanDenBerg; Lyndon R. Leining, both of Austin, all of Minn.

[73] Assignee: Hormel Foods Corporation, Austin, Minn.

[21] Appl. No.: 597,502

[22] Filed: Feb. 2, 1996

Related U.S. Application Data

[62] Division of Ser. No. 390,116, Feb. 17, 1995, Pat. No. 5,514,032.

[51] Int. Cl.⁶ .................................................. A22C 18/00
[52] U.S. Cl. ........................... 452/171; 452/157; 452/148
[58] Field of Search .................................... 452/157, 171, 452/148, 156, 158

[56] References Cited

U.S. PATENT DOCUMENTS

| | | | |
|---|---|---|---|
| Re. 28,508 | 8/1975 | Neebel et al. | 452/171 |
| Re. 33,851 | 3/1992 | Rudy et al. | 452/150 |
| Re. 33,904 | 4/1992 | Rudy et al. | 452/150 |
| 3,234,591 | 2/1966 | Vogt et al. | |
| 3,364,514 | 1/1968 | Hartl et al. | |
| 3,546,737 | 12/1970 | Neebel et al. | 452/171 |
| 3,685,095 | 8/1972 | Metro | |
| 3,771,196 | 11/1973 | Doerfer et al. | 452/157 |
| 3,800,363 | 4/1974 | Lareyre | 452/171 |
| 3,849,836 | 11/1974 | Bernard et al. | |
| 3,908,229 | 9/1975 | Harben, Jr. et al. | |
| 4,009,652 | 3/1977 | Anderson | 99/590 |
| 4,030,162 | 6/1977 | Hubbard | |
| 4,134,181 | 1/1979 | Schneider, Jr. | 452/171 |
| 4,189,806 | 2/1980 | Van Heyningen | |
| 4,209,878 | 7/1980 | Albert | |
| 4,246,837 | 1/1981 | Chenery | 99/486 |
| 4,413,375 | 11/1983 | Cliff, Jr. | |
| 4,557,019 | 12/1985 | Van Devanter et al. | 452/157 |
| 4,601,083 | 7/1986 | Shoji et al. | |
| 4,726,094 | 2/1988 | Braeger | 452/157 |
| 4,970,755 | 11/1990 | Leblanc | 452/134 |
| 4,979,269 | 12/1990 | Norrie | 452/134 |
| 5,090,939 | 2/1992 | Leblanc | 452/127 |
| 5,133,687 | 7/1992 | Malloy | 452/149 |
| 5,162,016 | 11/1992 | Malloy | 452/149 |
| 5,192,243 | 3/1993 | Weustink | 452/157 |
| 5,194,036 | 3/1993 | Chevalier et al. | 452/198 |
| 5,205,779 | 4/1993 | O'Brien et al. | 452/157 |
| 5,215,496 | 6/1993 | Heiland et al. | 452/157 |
| 5,226,850 | 7/1993 | Klaassen | 452/171 |
| 5,234,371 | 8/1993 | Andre et al. | 452/171 |
| 5,295,898 | 3/1994 | Andre et al. | 452/171 |
| 5,334,084 | 8/1994 | O'Brien et al. | 452/157 |
| 5,407,384 | 4/1995 | Boody et al. | 452/171 |

OTHER PUBLICATIONS

Automatic Loin Fat Trimmer Brochure, Knud Simonsen Industries Limited, (no date).
Model LB–LP Arcuate Blade Loin Puller Brochure, Best & Donovan, (no date).
Photographs of Protocon B.V. Prototype (at least as early as 1985).

*Primary Examiner*—Willis Little
*Attorney, Agent, or Firm*—Merchant, Gould, Smith, Edell, Welter & Schmidt, P.A.

[57] ABSTRACT

A loin separation apparatus and method of operation therefor controls a loin knife assembly in a manner which simulates the anthropomorphic motions of a human operator during a loin pulling operation. The loin knife assembly includes a U-shaped knife blade which is mounted to an arm which is connected to the apparatus through a universal joint to permit lateral and vertical displacement of the knife blade. Moreover, the separation between the sides of the loin knife may be varied. The combination of lateral displacement and varying the separation between the sides of the blade enables the sides of the knife blade to follow separate profiles. The loin separation apparatus generates customized cutting profiles and/or modifies standard cutting profiles for the loin knife assembly, as well as for a scribe saw assembly which may also be included on the apparatus, based upon the particular dimensions, contours, etc. of a specific side of meat.

6 Claims, 15 Drawing Sheets

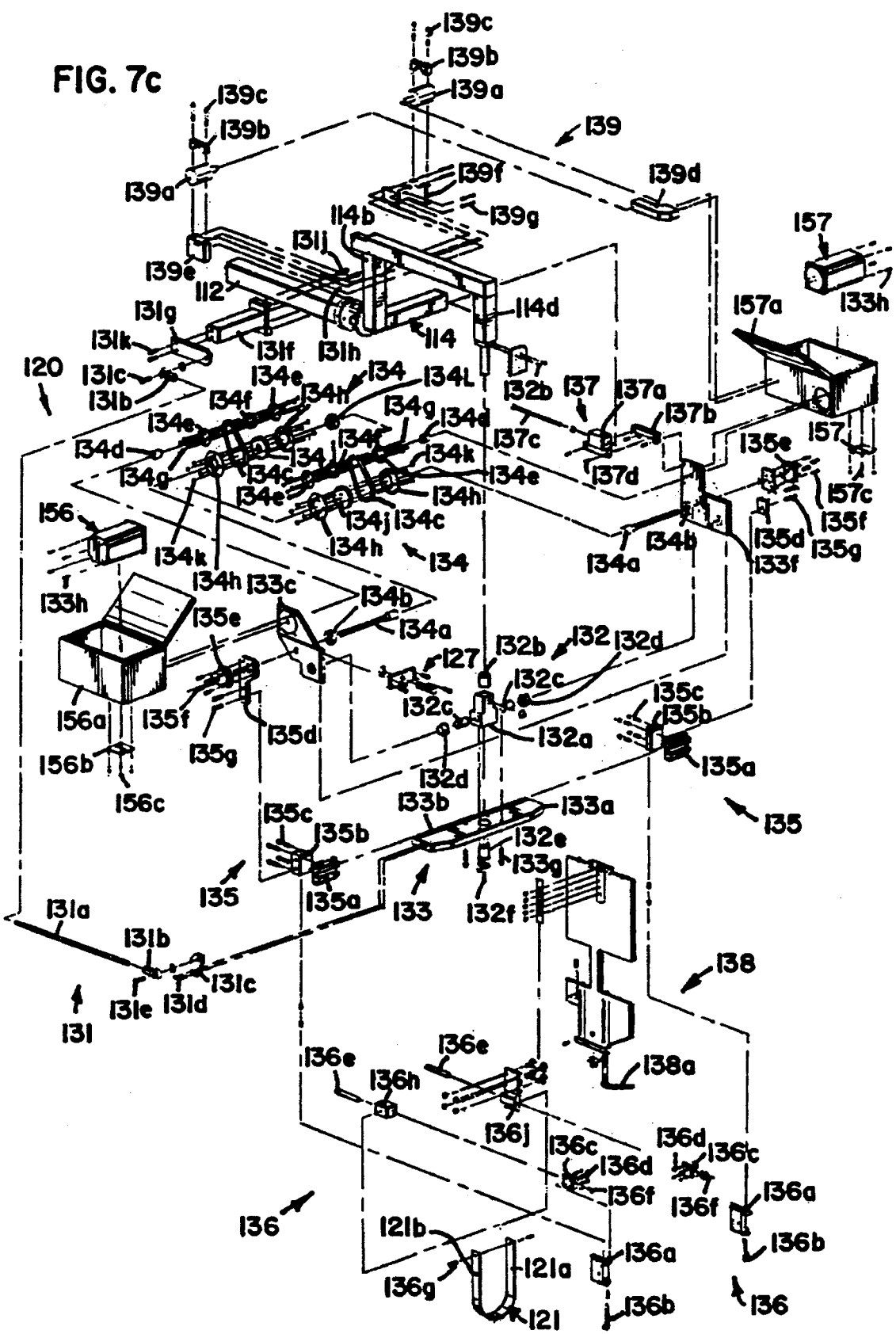

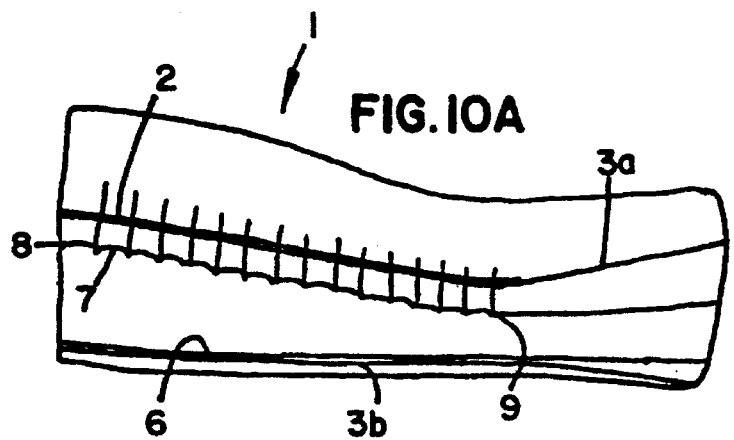
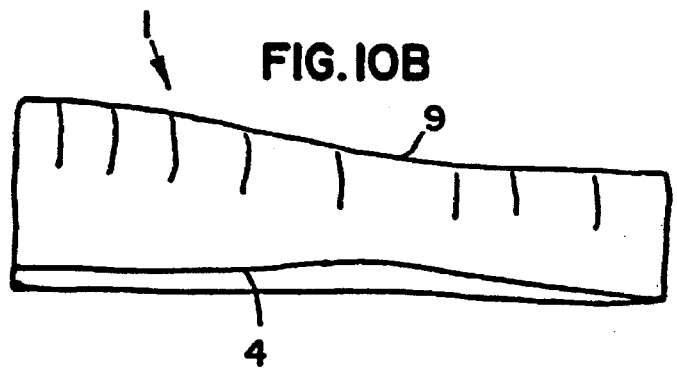
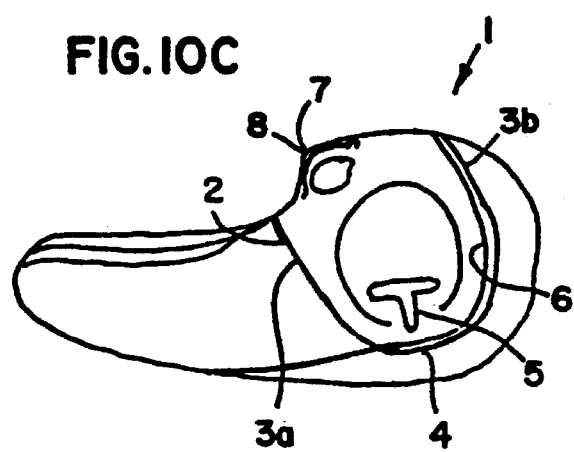

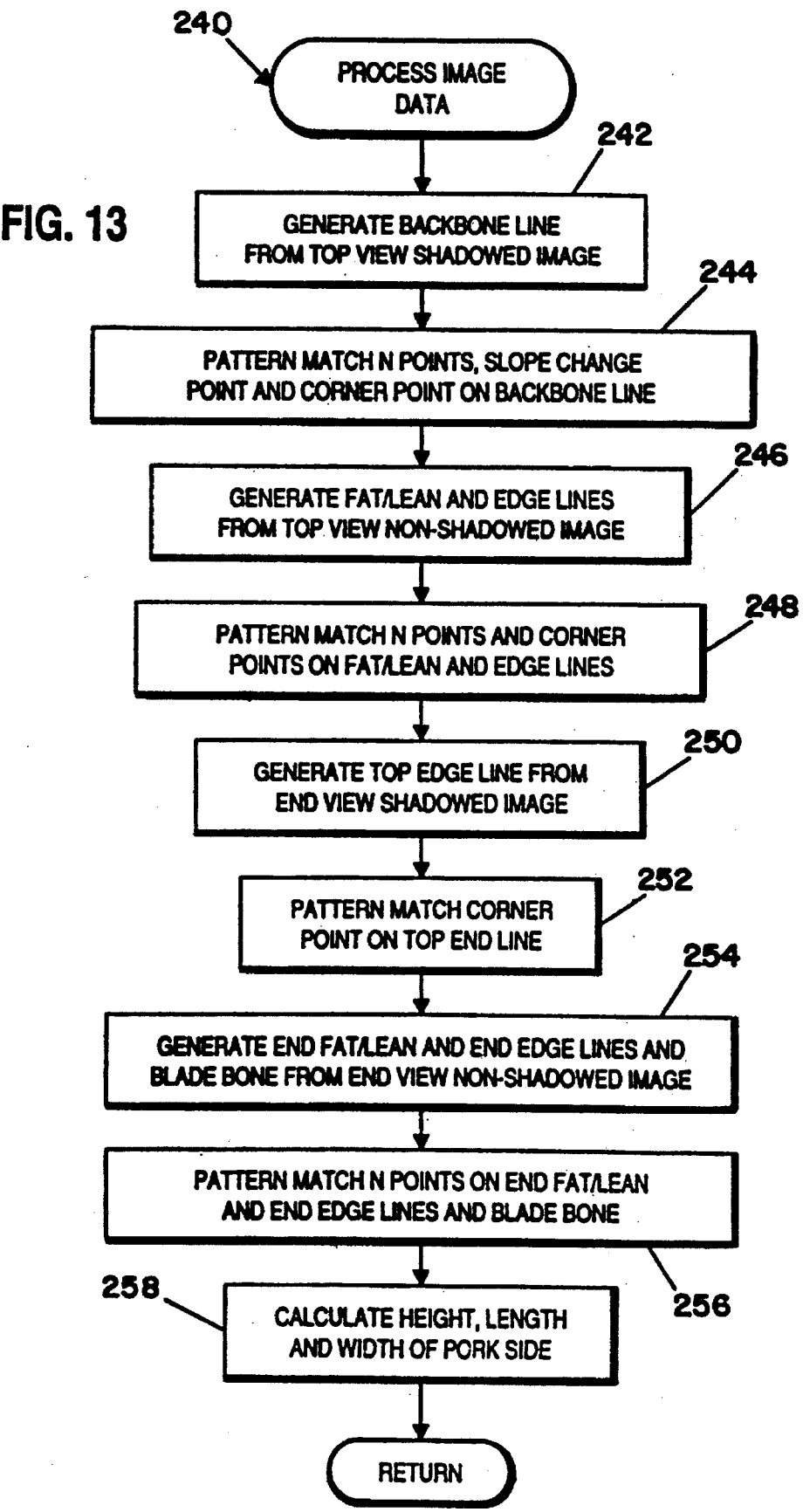

LOIN SEPARATION APPARATUS AND METHOD OF OPERATION THEREFOR

This is a divisional of application Ser. No. 08/390,116, filed Feb. 17, 1995, which applications are incorporated herein by reference now U.S. Pat. No. 5,514,032.

FIELD OF THE INVENTION

The invention is directed to an apparatus and method for butchering pork and other meat. More particularly, the invention is directed to apparatus and method for separating loin and belly portions from a side of pork through scribing and loin pulling operations.

BACKGROUND OF THE INVENTION

Various steps are typically required in the processing of meat carcasses such as hog carcasses. One step that typically occurs after a hog is slaughtered, the head, skin and appendages are removed, and the carcass is separated into separate pork sides, is to separate the loin and belly portions of the individual pork sides from one another.

The separation of a pork loin from a pork belly is typically referred to as a loin pulling operation, whereby an arcuate U-shaped knife blade is pulled through a pork side generally along the backbone to separate the loin from the belly. Typically, this involves a preceding step of scribing the ribs to facilitate pulling the knife through the side, as well as a subsequent step of trimming fat from the loin, to obtain a loin with optimum fat covering.

These operations are traditionally performed by human operators using different hand-held tools. An operator at a first station runs a hand held power scribe saw along the backbone of a pork side to cut the ribs from the backbone. The scribe saw has a circular blade which cuts approximately ½ inch deep into the pork side, which is sufficient to sever the ribs. The optimum scribe cut generally follows the contour of the backbone, while starting at about 1¼ inch in from the backbone itself.

The pork side is next transferred to a second station where another operator pulls a U-shaped loin pulling knife through the pork side generally along the backbone to manually separate the loin from the pork belly. In this operation, one side of blade follows the scribe cut through the ribs, while the other side of the blade is maintained as close as possible to the junction between the fat back and the meat of the loin, known as the fat/lean separation line. Several modifications of this general operation are learned by experienced operators to obtain higher yields. For instance, an operator must make sure the bottom of the loin pulling knife clears the "T"-shaped blade bone at the beginning of the cut, as well as the aitch bone at the end of the cut. In addition, the knife may be flared at the end of the cut to maximize the amount of ham kept with the loin. Other subtle movements such as rotating, widening, and tilting the knife blade are learned by more experienced operators to improve the finished product.

A third step of trimming fat from the separated pork loin is also typically required regardless of the experience of the operators, as some excess fat will typically be left on a pulled loin. Some fat is preferred on a loin to keep it from drying out during storage. However, any amount of fat is typically not appealing to consumers, so most of the fat needs to be removed to leave the minimum amount necessary to keep the loin from drying out. It has been found that a fat covering of about 0.1 inch is preferred on a loin, although other thicknesses may also be desired in different circumstances. The fat trimming operation necessary to provide the optimum fat cover is typically manually performed by a separate operator at another station.

Using human operators to perform loin pulling, however, poses several problems. Most notably, loin pulling is one of the most difficult jobs found in a pork processing plant. Turnover is relatively high, since the position is typically reserved for new employees who often transfer to other jobs as soon as they get enough seniority. Therefore, it is difficult to train and keep experienced operators that can efficiently perform the operations and provide high quality product. Also, even experienced operators are not capable of sufficiently high output due to the difficulty of the operations. Further, since the separate steps in separating a loin from a pork belly are performed by different operators at different stations, additional handling and/or transfer steps are often required. In addition, it is difficult for any operator to get the optimum fat levels and loin/ham yield from any side of pork. Consequently, high amounts of unacceptable loins often result from the loin separation process.

To address the problems associated with manual loin separation processes, various automated loin separation systems have been proposed. Examples include U.S. Pat. No. RE 28,508 to Neebel et al., U.S. Pat. No. 3,234,591 to Vogt et al., U.S. Pat. No. 3,685,095 to Metro, U.S. Pat. No. 3,771,196 to Doerfer et al., U.S. Pat. No. 4,189,806 to Van Heyningen, U.S. Pat. Nos. 4,970,755 and 5,090,939 to Leblanc, U.S. Pat. No. 4,979,269 to Norrie, and U.S. Pat. Nos. 5,234,371 and 5,295,898 to Andre et al., among others.

Many of these systems attempt to replace human operators with automated loin knives and scribe saws, often resulting in more efficiency and more repeatable results. However, many prior automated systems are limited in the degree of control they provide over the loin knife and scribe saw. In particular, many systems only allow adjustment of a loin knife and/or a scribe saw in at most one or two axes of motion. It will be appreciated that every pork side is somewhat different in contour, size, weight, etc. Furthermore, it is difficult to reproduce the different subtle motions experienced human operators use to optimize end products with limited control over the loin knife and scribe saw. Thus, conventional automated systems often are not capable of separating loins from bellies at the optimum points of separation, often resulting in unacceptable waste product and lower yields.

Thus, a need has existed in the art for an automated system which offers greater control over loin knife and scribe saw operations to optimize yield and reduce amount of waste product. In particular, there is a need for a loin separation apparatus which may provide customized processing of individual sides of meat to optimize the various operations for each side and thereby result in higher quality and more consistent end products.

SUMMARY OF THE INVENTION

The Invention addresses these and other problems in prior art by providing a loin separation apparatus and method which offers increased control over loin pulling and scribing operations. Preferred apparatus consistent with the invention generate customized cutting profiles and/or modify standard cutting profiles for the loin knife and scribe saw assemblies of the apparatus based upon the particular dimensions, contours, etc. of a specific side of meat, thus optimizing yield and reducing waste product, while providing improved, productivity and reduced processing time.

Several advantages may be realized from preferred embodiments of the invention. For example, a preferred loin separation apparatus may include a loin knife assembly which is controllable to enable the sides of a U-shaped knife blade to follow separate profiles and thereby optimize the cuts formed therefrom. Further, through the use of image processing and motion control, custom profiles may be calculated for the scribe saw and loin knife assemblies to provide optimized operation thereof. Moreover, the movement of the scribe saw and/or the loin knife assemblies through a side of meat may be facilitated through the use of forward steering couplings, which act as casters and assist in steering the respective assemblies through the side of meat.

Therefore, in accordance with one aspect of the invention, there is provided a loin separation apparatus for separating a loin portion from a side of meat. The apparatus includes a frame; conveying means, coupled to the frame, for conveying a side of meat through the apparatus; a loin knife assembly, coupled to the frame, the loin knife assembly including an arm pivotally coupled to the frame to pivot about a lateral axis, a generally U-shaped knife blade coupled to the arm and having first and second sides, vertical moving means for moving the arm vertically about the lateral axis, and first and second lateral moving means for respectively moving the first and second sides of the knife blade in a lateral direction; and a controller, coupled to the conveying means, the vertical moving means and the first and second lateral moving means, for controlling movement of the loin knife assembly to separate the loin portion from the side of meat as the side of meat is conveyed through the apparatus.

According to another aspect of the invention, a loin knife assembly is provided for use in a loin separation apparatus. The assembly includes an arm pivotally coupled to the loin separation apparatus to pivot about lateral and vertical axes; a head assembly, coupled to the arm, the head assembly including a generally U-shaped knife blade having first and second sides; vertical moving means for moving the arm vertically about the lateral axis; lateral adjustment means for moving the arm laterally about the vertical axis; and width adjustment means for varying the separation between the first and second sides of the knife blade.

According to an additional aspect of the invention, a loin knife assembly is provided for use in a loin separation apparatus. The assembly includes a generally U-shaped knife blade having first and second sides; vertical moving means for moving the knife blade in a vertical direction; and first and second lateral moving means for respectively moving the first and second sides of the knife blade in a lateral direction.

According to a further aspect of the invention, a scribe saw assembly is provided for use in a loin separation apparatus. The assembly includes a steering coupling; scribe saw moving means for moving the steering coupling along a lateral axis relative to the loin separation apparatus; a saw blade mounting assembly, pivotally mounted to the steering coupling at a forward point thereon to rotate about a vertical axis, including a saw blade and drive means for rotating the saw blade; and height adjustment means, coupled to the saw blade mounting assembly, for automatically controlling the cutting depth of the saw blade.

In accordance with another aspect of the invention, there is provided a loin separation apparatus for separating a loin portion from a side of meat. The apparatus includes a loin knife assembly, including a generally U-shaped knife blade having first and second sides, first and second lateral moving means for respectively moving the first and second sides of the U-shaped knife blade in a lateral direction, and vertical moving means for moving the U-shaped knife blade in a vertical direction; conveying means for conveying a side of meat past the loin knife assembly; an imaging camera positioned to generate a top plan image of the side of meat; and a controller, coupled to the loin knife assembly, the conveying means, and the imaging camera. The controller includes image processing means for determining backbone and fat/lean separation lines from the top plan image, profile calculating means for generating profiles for the vertical moving means and the first and second lateral moving means to control the first side of the U-shaped knife blade to follow a preset distance from the backbone line, and the second side of the U-shaped knife blade to follow a preset distance from the fat/lean separation line, and activating means for activating the vertical moving means, the first and second lateral moving means and the conveying means to follow the profiles generated by the profile calculating means.

In accordance with a further aspect of the invention, a control system is provided for use in a loin separation apparatus of the type including a loin knife assembly having a generally U-shaped knife blade, first and second lateral moving means for respectively moving first and second sides of the knife blade in a lateral direction, and a vertical moving means for moving the U-shaped knife blade in a vertical direction; and conveying means for conveying a side of meat past the loin knife assembly. The control system includes an imaging system, the imaging system including means for generating a top plan image of the side of meat and means for processing the top plan image to locate a backbone line and a fat/lean separation line on the side of meat; a host controller, coupled to the imaging system and the motion control system, the host controller including profile calculating means for generating profiles for the conveying means, the vertical moving means and the first and second lateral moving means such that the first side of the U-shaped knife blade follows a preset distance from the backbone line and the second side of the U-shaped knife blade follows a preset distance from the fat/lean separation line as the conveying means conveys the side of meat past the loin knife assembly; and a motion control system for controlling the first and second lateral moving means, the vertical moving means and the conveying means to each follow the profiles generated by the host controller.

In accordance with an additional aspect of the invention, a method is provided for separating a loin portion, from a side of meat in a loin separation apparatus of the type including a loin knife assembly having a generally U-shaped knife blade, first and second lateral moving means for respectively moving first and second sides of the knife blade in a lateral direction, and a vertical moving means for moving the U-shaped knife blade in a vertical direction. The method includes the steps of generating a top plan image of a side of meat; determining the location of a backbone line and a fat/lean separation line on the side of meat from the top plan image; generating profiles for the vertical moving means and the first and second lateral moving means to control the first side of the U-shaped knife blade to follow a preset distance from the backbone line, and the second side of the U-shaped knife blade to follow a preset distance from the fat/lean separation line; and activating the vertical moving means, the first and second lateral moving means and the conveying means to follow the generated profiles.

These and other advantages and features, which characterize the invention, are set forth in the claims annexed hereto and forming a further part hereof. However, for a better understanding of the invention, and the advantages and objectives attained by its use, reference is made to the drawing which forms a further part hereof, and to the following descriptive matter, in which there is discussed a preferred embodiment of the invention.

BRIEF DESCRIPTION OF THE DRAWING

FIGS. 7a, 7b and 7c are exploded perspective views of the loin knife assembly for the apparatus of FIG. 1. FIG. 7a shows the pivotal coupling assembly, FIG. 7b shows the arm assembly, and FIG. 7c shows the head assembly therefor. FIG. 7a also shows the push-off piston for the apparatus of FIG. 1.

FIGS. 10a, 10b and 10c are top plan, side elevational and end elevational views, respectively, of a pork side, showing preferred cutting profiles for scribe saw and loin knife assemblies consistent with the invention.

FIG. 13 is a flowchart showing the PROCESS IMAGE DATA routine from FIG. 12.

DETAILED DESCRIPTION OF THE PREFERRED EMBODIMENTS

Figure 1:
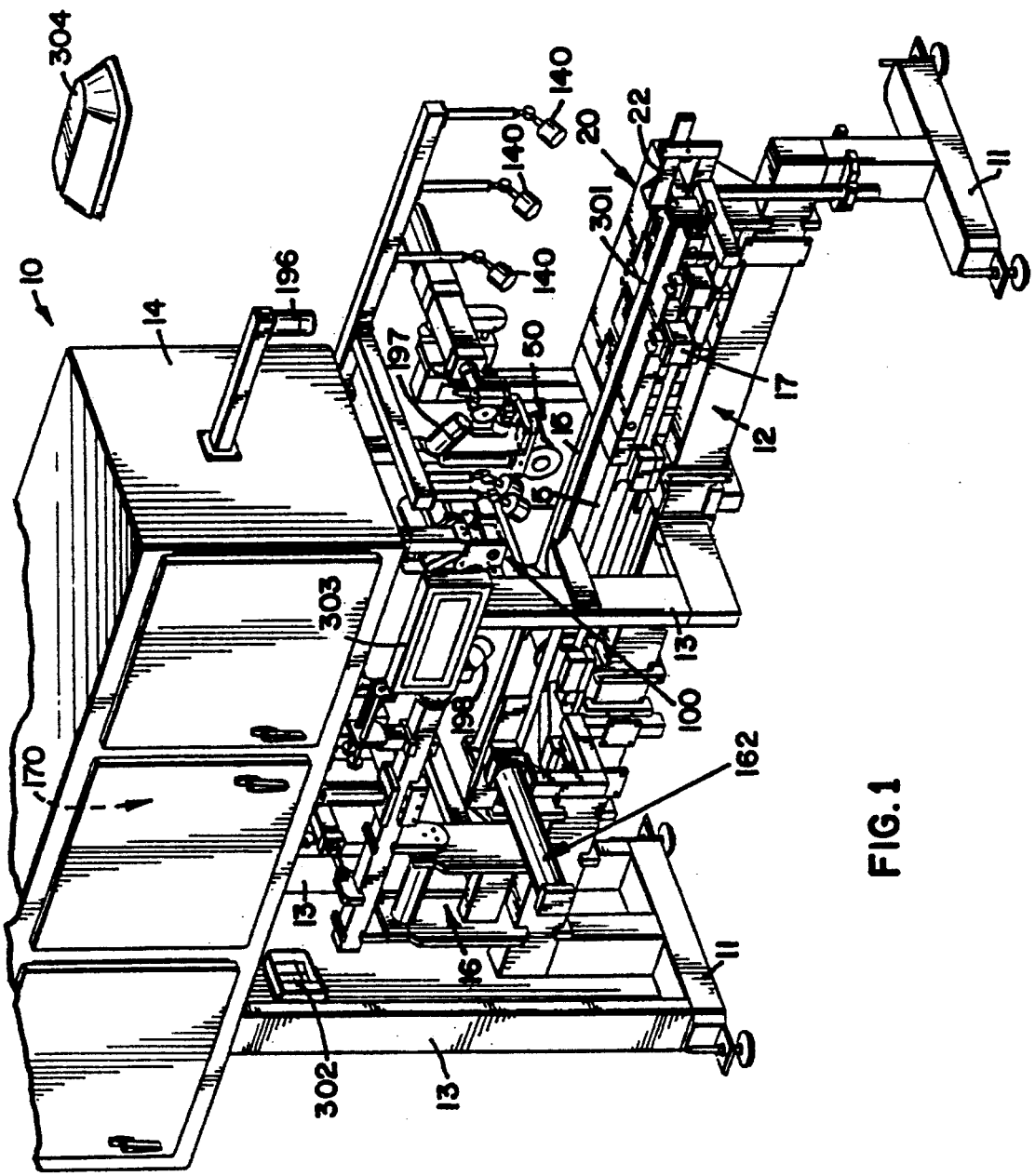
FIG. 1 is a perspective view of a preferred loin separation apparatus consistent with the invention.
Figure 2:
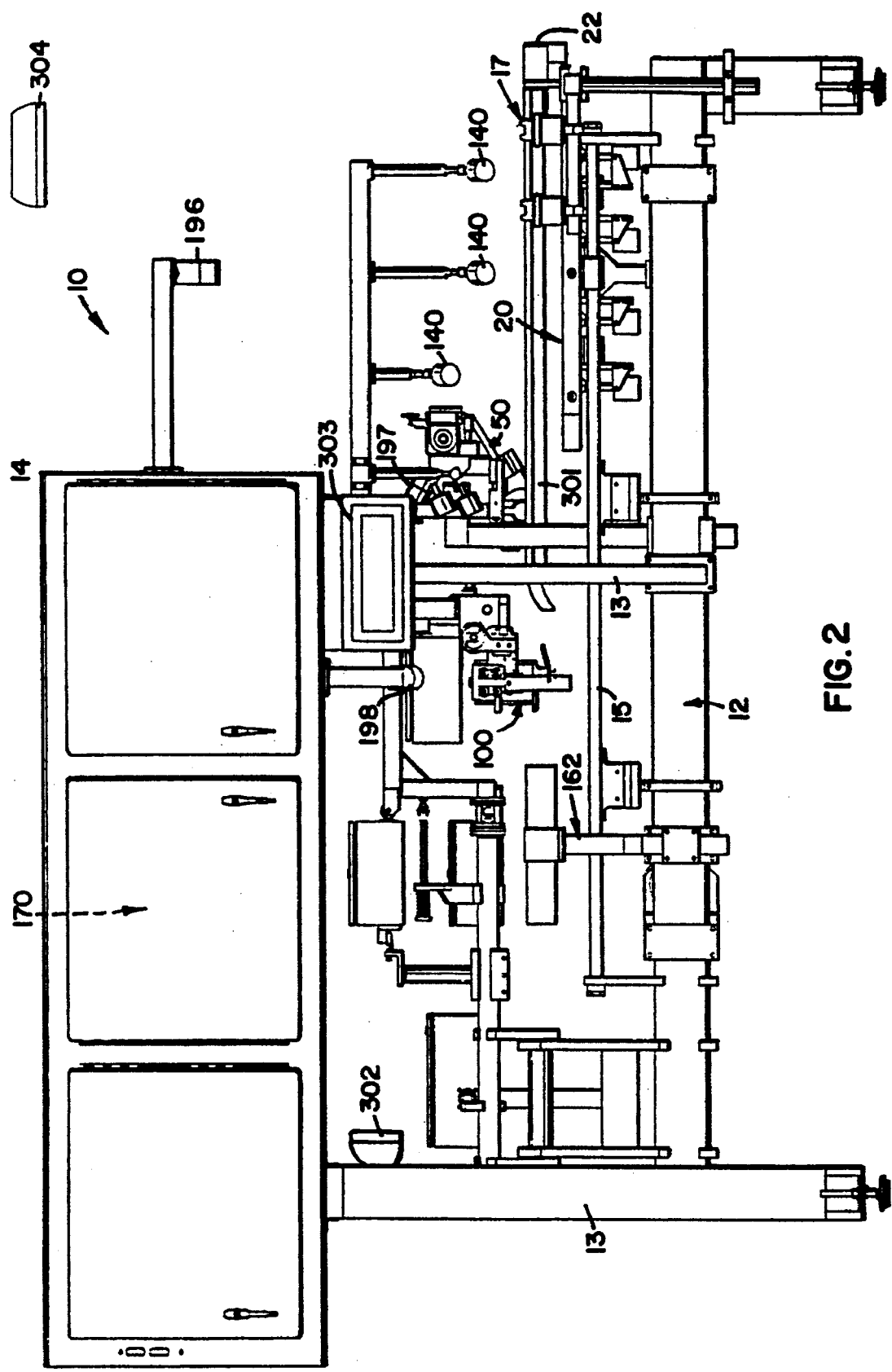
FIG. 2 is a side elevational view of the apparatus of FIG. 1.
Figure 3:
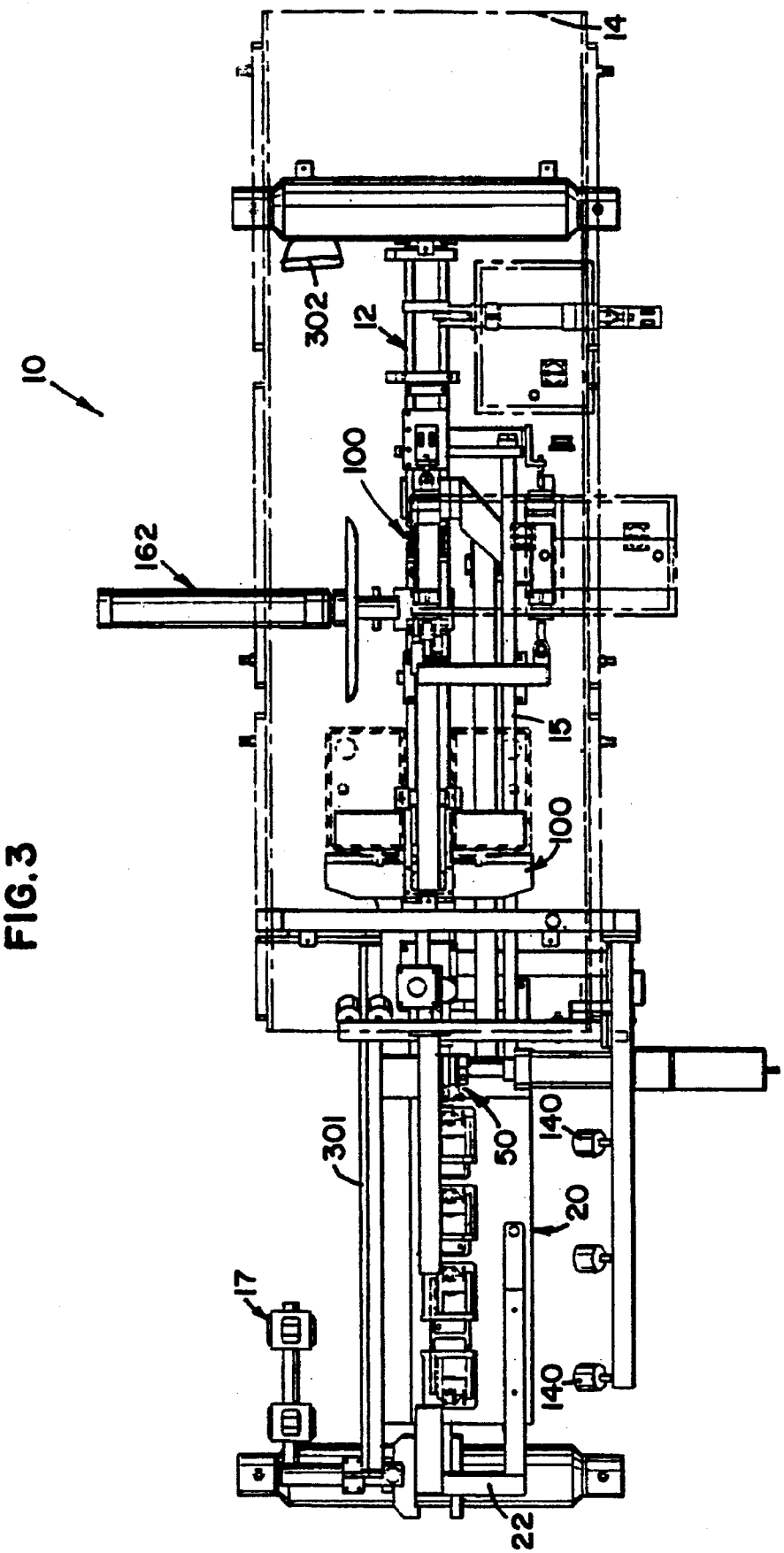
FIG. 3 is a top plan view of the apparatus of FIG. 1, with the control system and cabinet therefor shown in phantom for ease of illustration.
Figure 4:
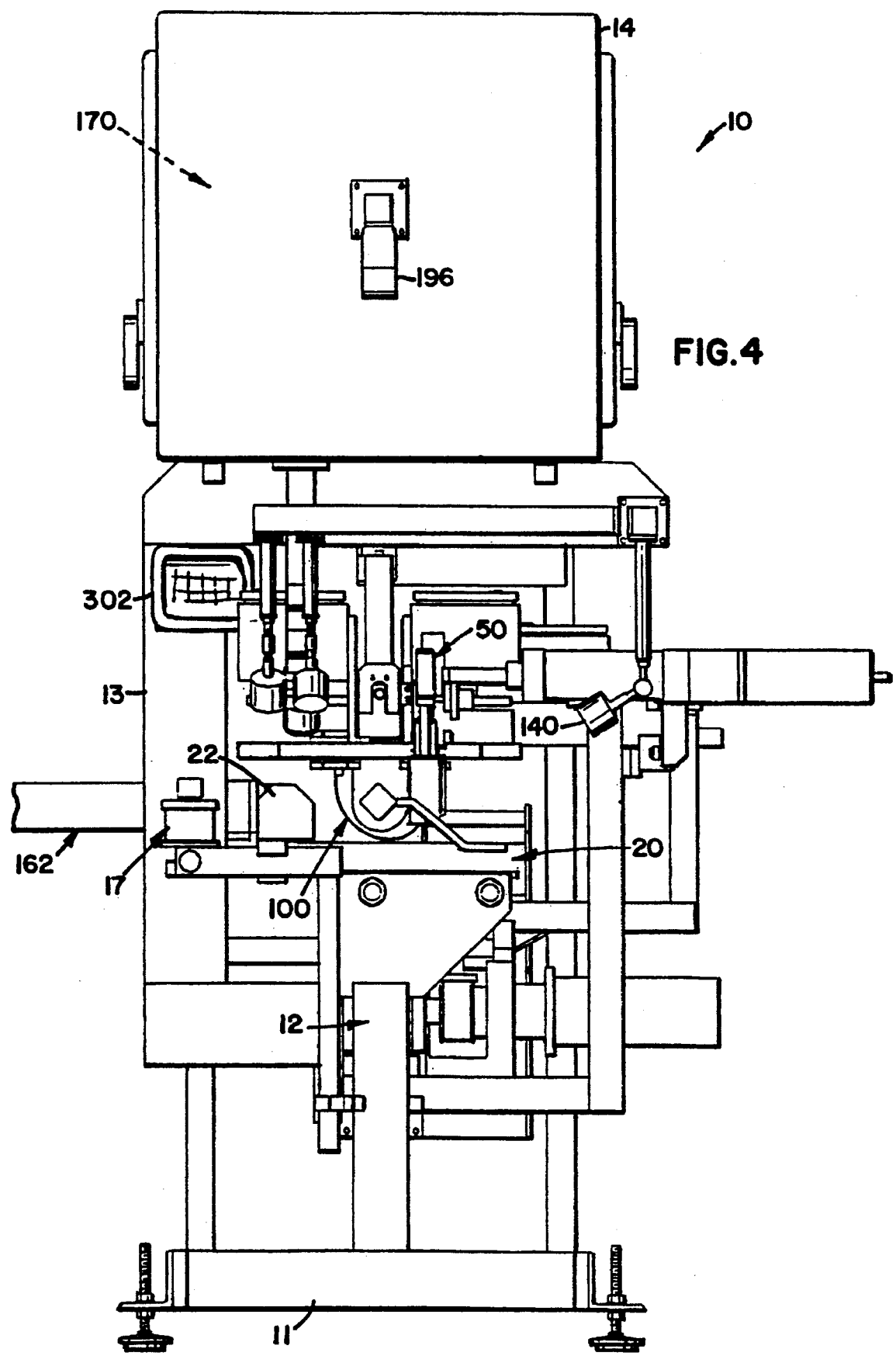
FIG. 4 is a front end elevational view of the apparatus of FIG. 1.

Turning to the Drawing, wherein like numbers denote like parts throughout the several views, FIGS. 1–4 show a preferred loin separation apparatus 10 consistent with the principles of the invention. Apparatus 10 generally includes a number of primary electromechanical systems which handle various functions in the loin separation process. A gripper platen 20 is provided which supports a pork side and transports it throughout the different operations in the loin separation process.

A scribe saw assembly 50 is also provided on apparatus 10 for scribing/cutting the ribs along the backbone of a pork side to facilitate the later loin pulling operation. In addition, a loin knife assembly 100 is provided to separate the pork loin from the belly (i.e., to "pull" the loin) after it has been scribed by scribe saw assembly 50.

An electronic control system 170 is also provided to control the different electromechanical systems of apparatus 10. Controller 170 includes a motion controller which drives a plurality of servos that activate and control platen 20, scribe saw assembly 50, and loin knife assembly 100. In addition, a separate imaging system is included to determine critical dimensional data for individual pork sides, enabling control system 170 to optimize the loin separation process based upon the dimensions of a particular side of pork.

The above-described systems are preferably disposed on a single frame 11. The frame also includes a horizontal support beam 12 that supports most of the primary electromechanical components, a plurality of upward supports 13, a controller cabinet 14 that is supported on supports 13 and houses most of control system 170, and a loin knife assembly support 16 which provides the primary support of loin knife assembly 100. The frame is preferably constructed of steel or another suitably strong structural material.

Further, the frame of apparatus 10 includes a pair of stainless steel rails 15 on which platen 20 is supported and allowed to slide upon when transporting a side of pork between the different stations in apparatus 10.

Figure 7A:
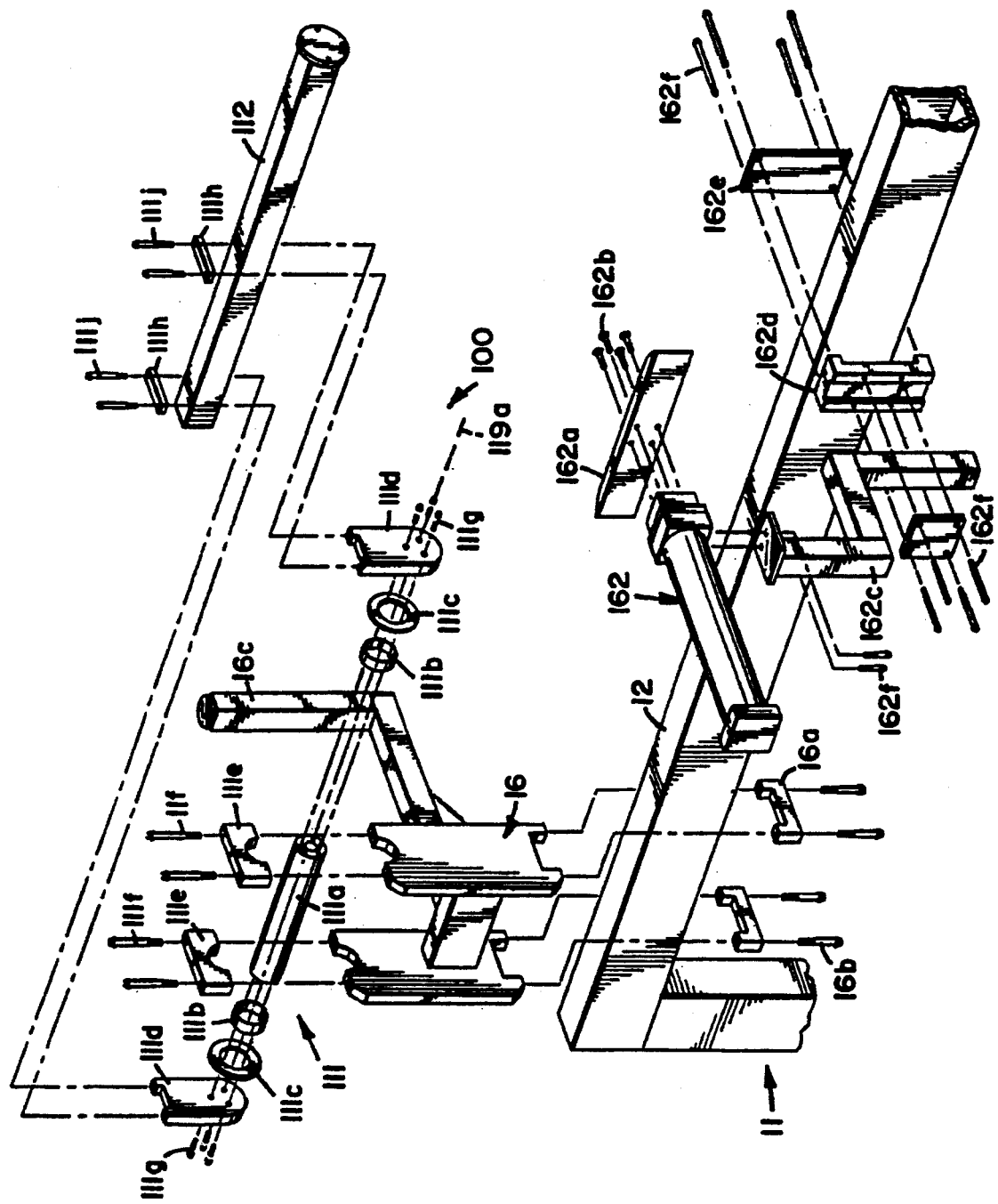

Several additional components are found on preferred apparatus 10. A push-off piston 162 is provided to eject the side from apparatus 10 once the loin and belly portions have been separated by loin knife assembly 100. As shown in FIG. 7a, piston 162 includes a push-off member 162a mounted through fasteners 162b. Piston 162 is mounted to beam 12 of frame 11 by brackets 162c, 162d, and 162f through a plurality of fasteners 162f. Piston 162 is preferably a pressure-actuated piston such as the No. NF18A-E02-AMA00 manufactured by C & C Manufacturing, Inc. Other suitable ejection devices are known in the art.

Returning to FIG. 1, with apparatus 10, a pork side will be passed through the scribe saw and loin knife assemblies on platen 20, then will be ejected from the platen at the end of a cycle by push-off piston 162. Alternatively, platen 20 may be returned to a start position with the loin knife blade lowered to a position to hit the loin portion of the pork side as the platen is returned, such that the loin portion will be dislodged from the platen, and the belly portion will be returned to the starting point to permit and operator to manually remove the belly and place a new pork side on the platen. It may be desirable to include more than two rails 15 such that a dislodged loin will rest on the "table" formed by the plurality of rails.

Several directional terms will be used hereinafter. Therefore, in the context of the preferred embodiments shown in the Drawing, a longitudinal direction will typically represent a direction along the length of the preferred apparatus, e.g., parallel to rails 15. A vertical direction will typically represent a direction upwards from the floor upon which the preferred apparatus is mounted, e.g., perpendicular to the plane formed by rails 15. Finally, a lateral direction will typically represent a direction across the width of the preferred apparatus, e.g., orthogonal to the vertical and longitudinal directions.

The preferred loin separation apparatus 10 is preferably for use in separating the loin and belly portions from a side of pork. However, it will be appreciated by one skilled in the art that the principles of the invention will apply to other butchering operations, as well as to other forms of meat including beef, lamb, veal, etc., and therefore the invention should not be limited as such. Each of the primary systems of apparatus 10 will now be described in greater detail below.

A. Gripper Platen

Figure 5:
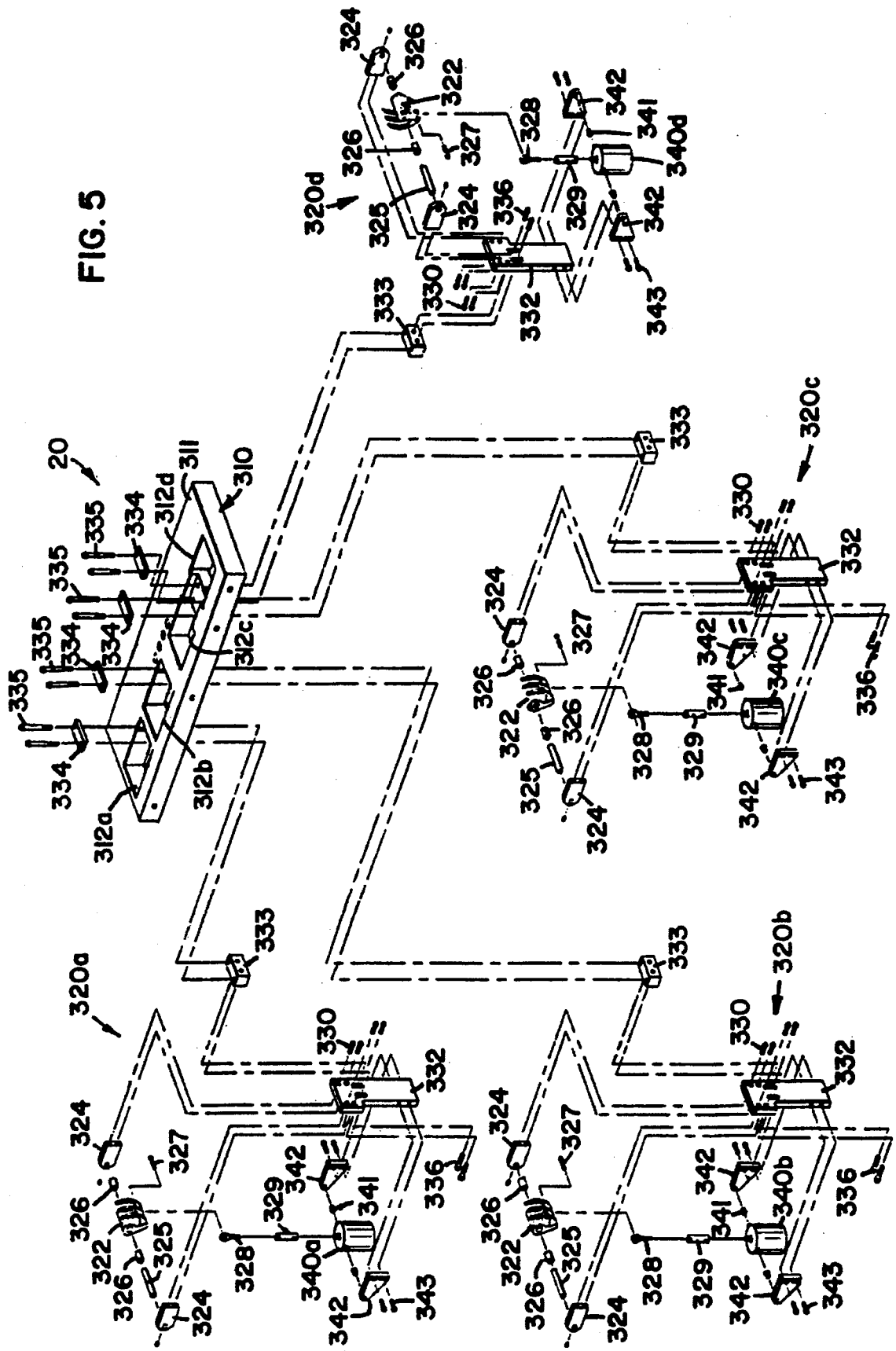
FIG. 5 is an exploded perspective view of the gripper platen for the apparatus of FIG. 1.

FIG. 5 shows gripper platen 20 in greater detail. As described above, platen 20 is a conveying means which helps in supporting and conveying a pork side throughout the different loin separation operations performed by apparatus 10. It has been found that maintaining a pork side in a fixed position on the platen (i.e., with minimum lateral or longitudinal shifting relative to the platen) is significant for ensuring that the image data calculated by the imaging system is valid during the subsequent scribing and loin pulling operations, given that these later operations must assume correct positioning of the pork side to obtain optimum results.

Gripper platen 20 includes a support member 310 having a support surface 311 which supports a pork side thereon. Support member 310 is preferably constructed of UHM-WPE, which has been found to be a sturdy and easily cleaned surface. Other materials, including different metals, plastics, and composites, may also be used.

A pork side is preferably positioned on platen 20 by an operator with the side resting on support surface 311. As shown in FIG. 1, a fixed side surface 301 mounted to frame 11 of apparatus 10 is used to properly position the pork side on the platen with the fat back downward and with the backbone running longitudinally proximate the side surface. Alternatively, platen 20 may have a second, inclined surface disposed thereon for assisting an operator in properly positioning a pork side on the platen. In addition, as is also shown in FIG. 1, an end stop member 22 is mounted to the end of platen 20 to abut the trailing end of a pork side placed on the platen and further assist an operator in properly positioning a side on the platen. Stop member 22 moves with support member 310 such that the stop will resist longitudinal movement of a pork side during the loin pulling operations.

Returning to FIG. 5, gripper platen 20 includes four gripper hook assemblies 320a, 320b, 320c and 320d which respectively project through apertures 312a, 312b, 312c and 312d in support surface 311 to hook onto the surface of a pork side lying on the platen. Each gripper hook assembly 320a–d is substantially the same, varying only in placement and orientation (forward or backward). For example, gripper hook assembly 320a includes a hook 322 rotatably mounted on an 325 with spacers 326 between brackets 324, which are in turn mounted by fasteners 330 to a main bracket 332. A pressure actuated gripper hook cylinder 340a, such as the No. FD-172-2FCMT SF manufactured by Bimba Mfg. Co., is rotatably mounted on brackets 342 with spacers 341 over pins on cylinder 340a, which are in turn mounted by fasteners 343 to main bracket 332. Bracket 332 is mounted through a spacer 333 to member 310 by fasteners 335 through top bracket 334. Cylinder 340a and hook 322 are coupled together by linkage 328, 329 which is connected at one end to the piston of cylinder 340a and at the other end to hook 322 offset from the rotational axis thereof defined by axle 325 through fastener 327. Gripper hook assemblies 320b–d are similarly configured.

Gripper hook assemblies 320a, 320b and 320c preferably orient their respective hooks forward, whereby the hooks will assist in resisting the forces applied to a pork side by the loin knife assembly. Gripper hook assembly 320d is preferably oriented opposite to the other assemblies, to assist in stretching out the pork side on platen 20, and to assist in the penetration of the other gripper hooks into the pork side.

Figure 9:
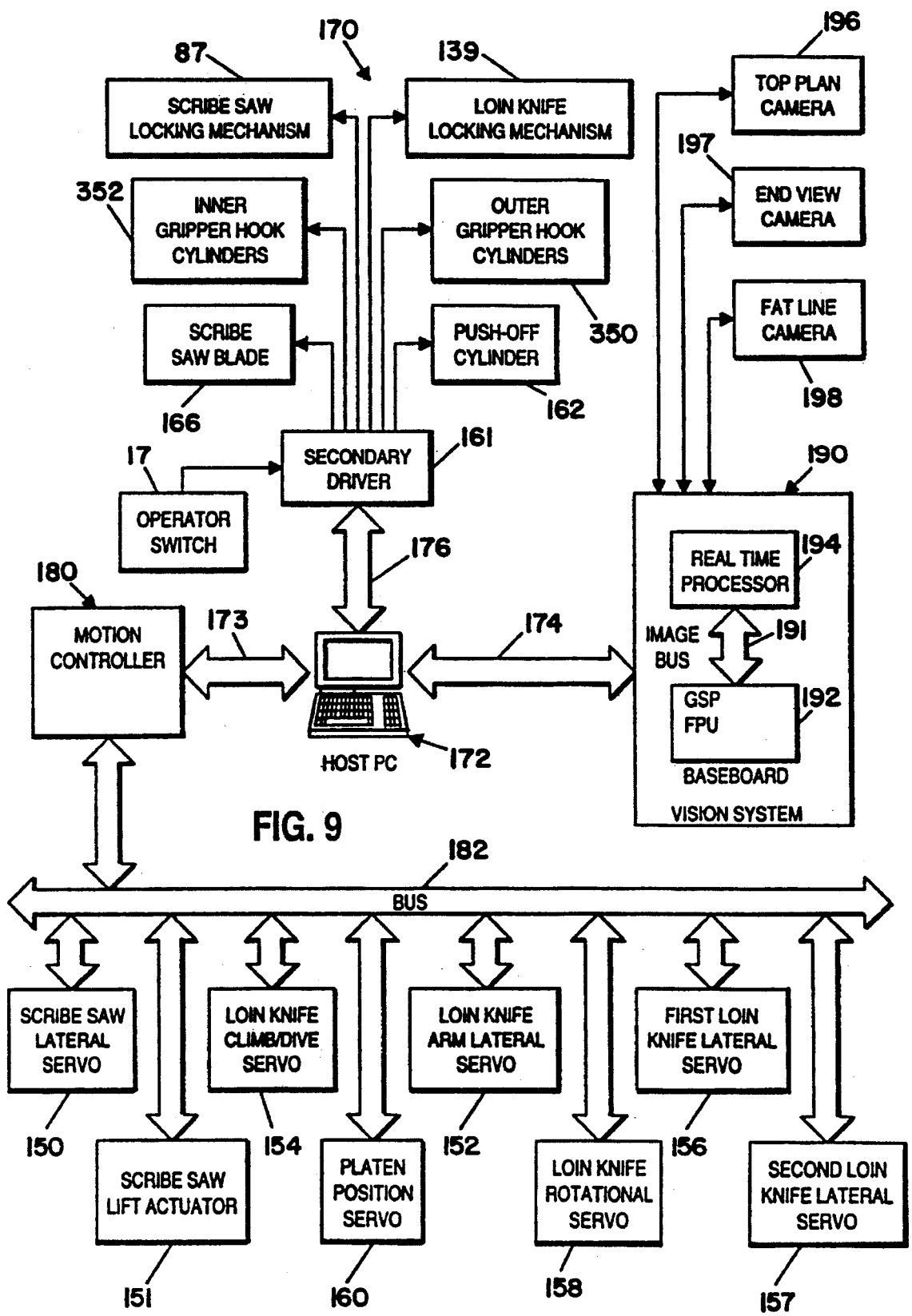
FIG. 9 is a functional block diagram of the control system for the apparatus of FIG. 1.

Cylinders 340a and 340d of the outer gripper hook assemblies are preferably connected to a source of pressure by a manifold and are controlled by a common valve 350 (shown schematically in FIG. 9), as are cylinders 340b and 340c of the inner gripper hook assemblies, which are controlled by a common valve 352 (also shown schematically in FIG. 9). Consequently, the inner and outer gripper hooks may be actuated separately.

The separate actuation of the inner and outer gripper hook assemblies has been found to be beneficial in that the outer gripper hook assemblies may be first actuated to stretch out the pork side and to initially grip the side sufficiently to enable the inner hook assemblies to penetrate the pork side without the side slipping on the platen. However, it will be appreciated that the hooks may be actuated in any order, or at the same time.

As an alternative, one or more vacuum cups may be disposed on platen 20 to provide supplemental attachment to a pork side. The vacuum cups are preferably connected to a source of vacuum to provide a seal against the pork side. The cups may include flexible bellows which conform to the pork side. The cups may also be retractable to permit the cups to pull the pork side taut against the platen.

Returning to FIGS. 1–4, platen 20 is shown supported on rails 15, and is moved between stations by sliding along these rails. Positioning of platen 20 is controlled by a platen servo 160, which is a stepper motor such as the No. S-4050 manufactured by Reliance Electric. Platen servo 160 moves platen 20 through a belt and pulley arrangement, whereby servo 160 rotates a pulley to move a belt to which platen 20 is secured. Other manners of controllably positioning platen 20 at various positions along rails 15 are known in the art.

Various modifications to the preferred conveying mechanism may be made. For example, additional vacuum cups, gripper hooks, support surfaces, etc. may be used. Further, conveyors such as are found in conventional loin separation devices may also be used. However, given the criticality of pork side positioning during imaging, scribing and loin pulling, it has been found that the platen configuration disclosed herein provides a more secure grip on a pork side throughout the different operations. In addition, the platen has been found to be comparatively easy to position, secure and release a pork side. Additional modifications will be appreciated by one skilled in the art.

B. Scribe Saw Assembly

Figure 6:
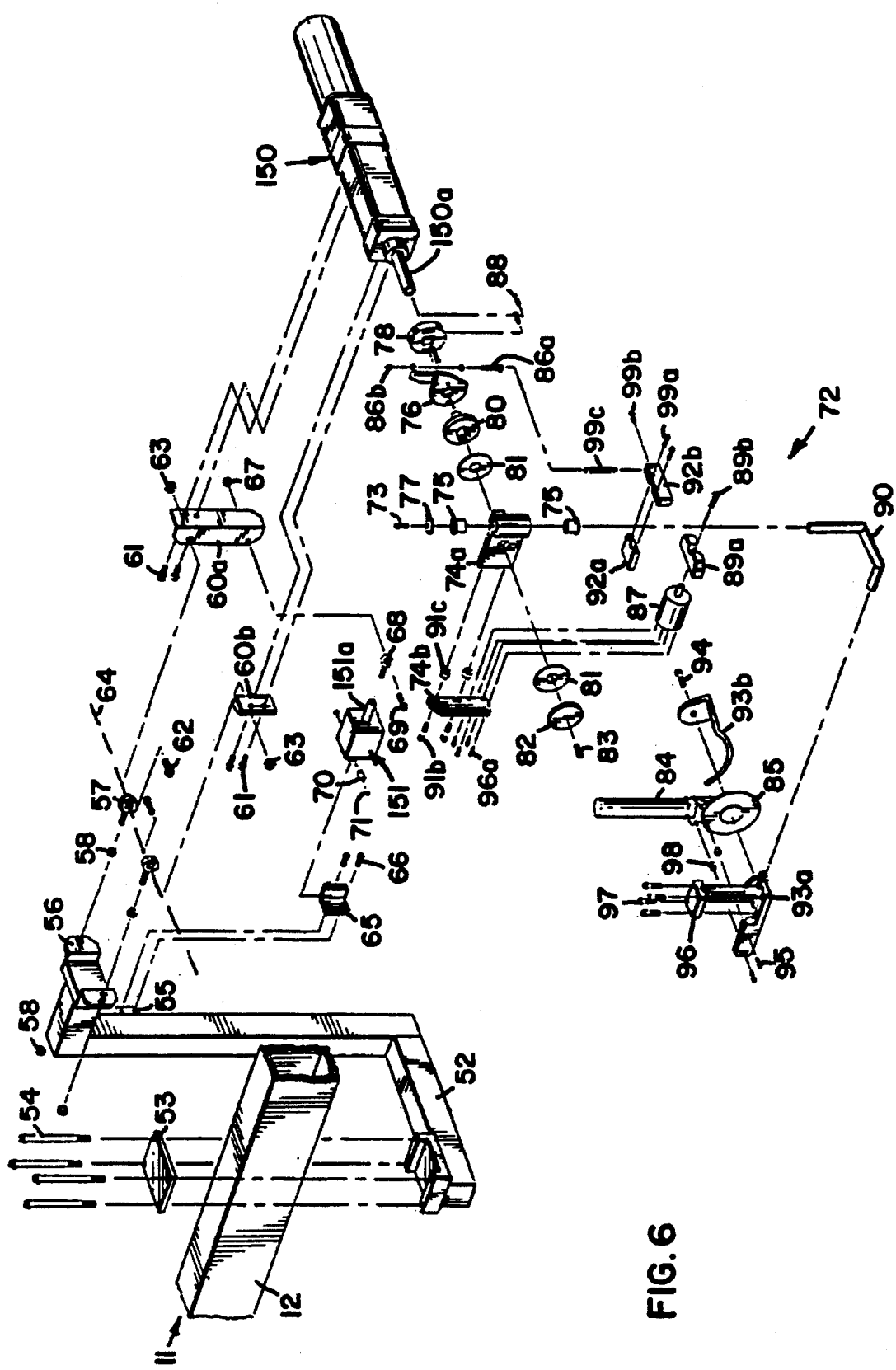
FIG. 6 is an exploded perspective view of the scribe saw assembly for the apparatus of FIG. 1.

FIG. 6 shows scribe saw assembly 50 in greater detail. Scribe saw assembly 50 is used to scribe, or cut, the ribs along the top surface of the pork side at a fixed or preset distance from the backbone. Scribing the ribs assists in the loin pulling operation because the cutting of the ribs does not have to be performed by the loin knife blade, thereby leaving the knife blade to cut only through meat and fat. The loin knife assembly may alternatively be used to cut through the ribs; however, it would require a much stronger and sturdier loin knife assembly, and would excessively wear the knife blade.

Scribe saw assembly 50 is preferably movable in two directions. A first means of movement for the assembly is provided by a scribe saw lateral servo 150, which is preferably a linear actuator servo such as the No. S-4050 manufactured by Reliance Electric. Servo 150 supports and moves a scribe saw head 72 along a lateral direction. A second means of movement for the assembly is provided by a scribe saw lift actuator 151, which is preferably an air cylinder such as the No. S2X25RC2FT2 manufactured by Compact Air Products. Actuator 151 preferably rotates scribe saw head 72 about a lateral axis to raise and lower the head between activated and non-activated positions.

Servo 150 is pivotally supported on a mounting beam 52, which is mounted to horizontal support beam 12 of frame 11 with an opposing plate 53 and fasteners 54. A pair of screw eye bolts 57 are mounted to end 56 of beam 52 using fasteners 58. A pair of servo mounting brackets 60a and 60b are mounted to servo 150 using fasteners 61. Brackets 60a and 60b are in turn mounted to screw eye bolts 57 using bolts 62 and nuts 63, such that they are pivotable about axis 64.

Actuator 151 is mounted to beam 52 through a mounting bracket 65 which is mounted to bracket 55 on beam 52 with fasteners 66. Actuator 151 is mounted to bracket 65 by pin 70 and clips 71 such that actuator 151 is pivotable about pin 70. Another screw eye bolt 68 is mounted to the piston 151a of actuator 151. Bracket 60a is then mounted to screw eye bolt 68 using bolt 69 and nut 67. Consequently, linear movement of piston 151a of actuator 151 will pivot servo 150 about axis 64.

Scribe saw head 72 is supported on ball screw actuator 150a of servo 150, and preferably is allowed to rotate about the longitudinal axis of the ball screw to enable the head to automatically adjust to maintain a relatively constant cutting depth as it scribes a pork side. Preferably, the cutting depth of the scribe saw blade is between ⅜ and ¾ inch, more preferably about ½ inch.

A bracket 74a is rotatably mounted to ball screw actuator 150a through threaded bolt 83, cover 82, spacers 81, bushing 80, and spring arm 76 mounted to slotted collar 78 with fasteners 88, and having a threaded stop 86a mounted thereto with nuts 86b. A bracket 74b is secured to bracket 74a with fasteners 91b and bushings 91c. The configuration of bracket 74a provides the automatic height adjustment for the saw blade by permitting bracket 74a to pivot about the ball screw actuator 150a.

A saw blade mounting assembly includes shaft 90, which is rotatably mounted to bracket 74a through a pair of sleeves 75, a cap 77 and a fastener 73. A clamping bracket 92a and clamp 92b are affixed to the shaft by bolts 99a. A spring 99c is affixed at one end to clamp 92b by fastener 99b, and at the other end to the threaded stop of spring arm 76. This configuration allows for automatic adjustment of cutting depth since head assembly 72 will be urged downward by spring 99c, and the saw blade will therefore ride along the surface of a pork side during scribing.

Bracket 74a also provides a forward steering coupling for shaft 90, which enables shaft 90 to "caster" and permit the scribe saw blade 85 to be steered through the pork side in response to lateral adjustments by servo 150. This castering operation may be controllably inhibited by a locking mechanism 87 (preferably an air cylinder) mounted to bracket 74b with fasteners 91a. A clamping bar 89a is mounted to mechanism 87 by fastener 89b, such that by activating locking mechanism 87, clamping bar 89a prevents lateral pivoting of head assembly 72 to locate the saw blade at a known fixed orientation. As discussed below, the blade is preferably locked in position when the starting point of the scribe cut is being found, then the blade is unlocked once scribing begins to permit the blade to be steered through the pork side.

The other end of shaft 90 is mounted to a bracket 93a by fasteners 97 and plate 96. The rotational position of bracket 93a about shaft 90 may be adjusted through this mounting configuration. Preferably, the bracket is about 0 to 30 degrees, more preferably about 15 degrees, offset from vertical.

A drive member 84, supporting scribe saw blade 85, is mounted to bracket 93a using fasteners 95 and washers 98. Drive member 84 has a pressure-driven drive means for driving or rotating the saw blade, which is preferably a Jarvis air motor. A connection to a source of pressurized air (not shown in FIG. 6) is provided on drive member 84 to actuate blade 85.

An opposing bracket 93b is mounted to drive member 84 with fastener 94. Bracket 93b includes the runner which is designed to ride along a side of pork and automatically maintain the ½ inch cutting depth for scribe saw blade 85.

Therefore, scribe saw assembly 50 may be controlled to follow a desired profile by activating the scribe saw blade, lowering the blade into an operating position using actuator 151, and then controlling servo 150 to vary the lateral placement of the scribe saw blade as the pork side is conveyed past the blade. The lateral positioning of the scribe saw blade may be initially locked by mechanism 87 to assist in reliably finding the starting position, then mechanism 87 may be released to permit the blade to be steered through the pork side. The cutting depth of the saw blade is maintained by the runner on bracket 93a inducing a rotation of bracket 74 relative to ball screw actuator 150a. Then, once the pork side has passed scribe saw assembly 50, the scribe saw blade may then be de-activated and the assembly raised by actuator 151. Further, as will be described below, it may be desirable to shut down the blade and raise the assembly at a predetermined point along the pork side after the ribs have been suitably scribed.

Various modifications may be made to the preferred scribe saw assembly consistent with the invention. For example, direct control over the height of the scribe saw head may be provided to generate a custom cutting depth profile for pork sides. Other modifications will also be appreciated.

C. Loin Knife Assembly

Figure 7B:
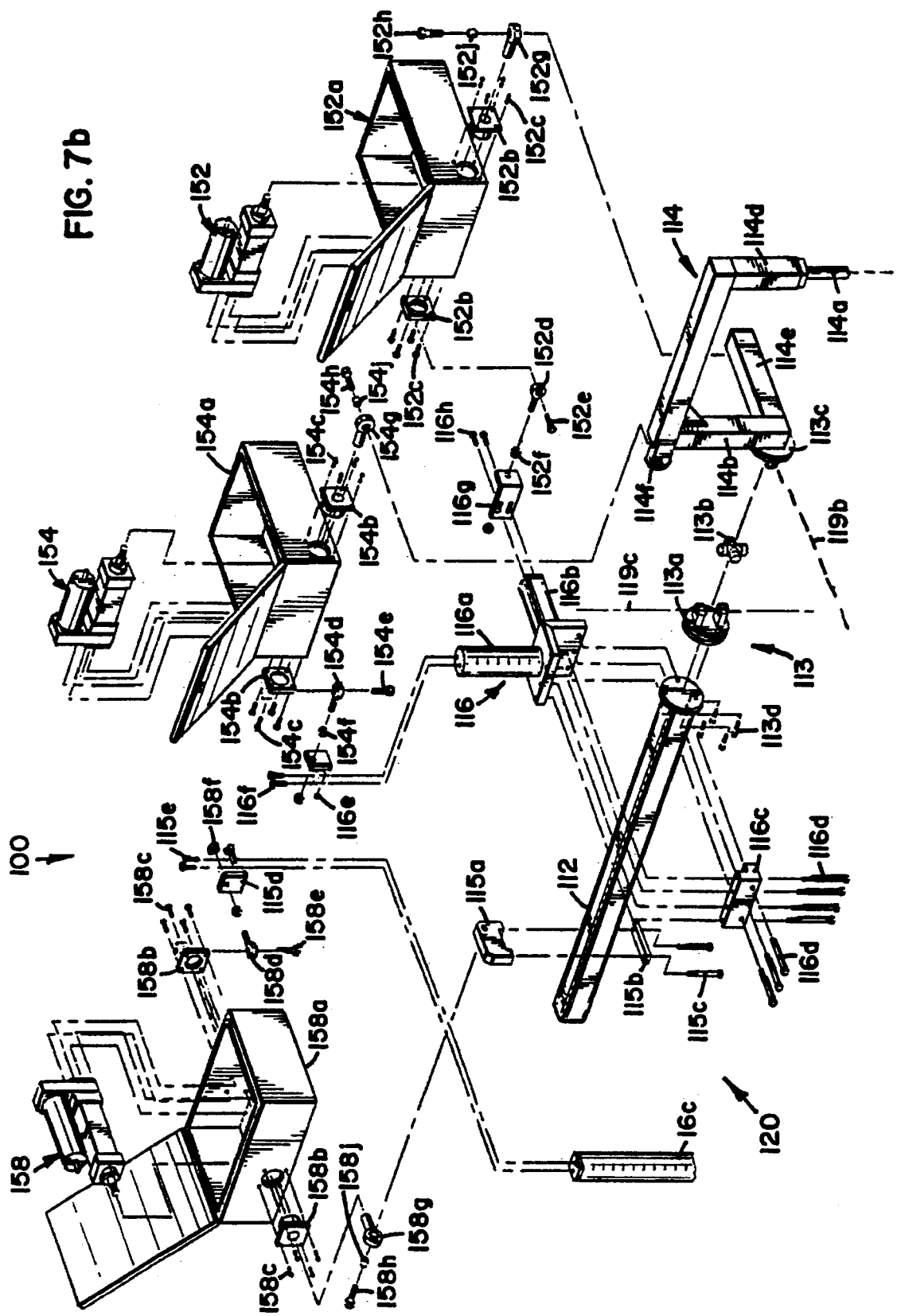

FIGS. 7a, 7b and 7c show loin knife assembly 100 in greater detail. Loin knife assembly 100 is used to separate the pork loin from the pork belly once the scribe cut has been made through the ribs. The separation is made by a loin knife which has an arcuate U-shaped blade, similar to the type of hand-held knife used by human operators. Through control of the knife blade along several axes, assembly 100 preferably produces an optimum separation between loin and belly, with a desired fat covering left on the loin.

Loin knife assembly 100 includes an arm assembly 110, a pivotal coupling assembly 111 and a head assembly 120. Pivotal coupling assembly 111, shown in FIG. 7a, provides the mounting mechanism for securing the loin knife assembly to frame 11. Arm assembly 110, shown in FIG. 7b, provides three axes of motion for the loin knife, and includes a cylindrical shaft 112 for supporting an arm 114. Head assembly 120, shown in FIG. 7c, provides a mounting assembly for the knife blade, and allows for lateral adjustments of each side of the blade.

Turning to FIG. 7a, pivotal coupling assembly 111 is rotatably mounted to loin knife support 16, which is in turn mounted to beam 12 of frame 11 by brackets 16a and bolts 16b. Assembly 111 includes a shaft 111a mounted to support 16 by brackets 111e and fasteners 111f through bearings 111b. A pair of brackets 111d are mounted to shaft 111a by fasteners 111g and using spacers 111c. A shaft 112 (part of arm assembly 110) is mounted to brackets 111d by brackets 111h and fasteners 111j. In this configuration, pivotal coupling assembly 111 permits shaft 112 to pivot along an arcuate path about axis 119a.

Turning to FIG. 7b, arm assembly 110 includes an arm 114 pivotally connected to shaft 112 at a first end through a universal joint 113, which includes a lateral pivot mount 113a mounted to shaft 112 with fasteners 113d, a climb/dive pivot mount 113c mounted to arm 114, and a pivot member 113b interconnected therebetween to allow pivoting about two axes, a lateral axis 119b (which permits vertical movement of the arm) and a vertical axis 119c (which permits lateral movement of the arm). A cover (not shown for illustrative purposes) is preferably included over universal joint 113 for protecting the assembly from dust and debris.

Arm 114 includes a number of members which orient a head assembly receiving shaft 114a generally offset a fixed distance from the pivot point formed by universal joint 113 to provide vertical (climb/dive) and lateral movement of head assembly 120. Several members on arm 114 are offset from the pivot points provided by universal joint 113 to enable the linear actuator servos (discussed below) to induce the lateral and climb/dive displacement of head assembly 120. In particular, first vertical member 114b provides a climb/dive offset from the pivot point of the arm, and lateral member 114e provides lateral offset therefrom. Horizontal member 114c and second vertical member 114d are in turn coupled between vertical member 114b and head assembly receiving shaft 114a (forming a second end of the arm) to orient the end of shaft 114a proximate the longitudinal axis of shaft 112 for balancing the arm.

Other configurations of arm 114 may be used consistent with the invention. However, it has been found that the particular arrangement of members 114a–e is preferred because the assembly is substantially balanced during operation. As will be discussed below, head assembly 120 "steers" the knife blade through the pork side (i.e., the blade trails behind the head assembly). Consequently, it is important to orient the shaft 114a in front of universal joint 113 and proximate the longitudinal axis of shaft 112 to enable the knife blade to trail the head assembly in a fluid and stable manner.

A number of linear actuator servos, including rotational servo 158, climb/dive servo 154 and lateral servo 152, are used to control the positioning of loin knife assembly 100 about different axes. Each servo is controlled in a manner which will be discussed in greater detail below.

Rotational servo 158 is disposed within a compartment 158a, and includes a pair of brackets 158b secured thereto by fasteners 158c. One of brackets 158b includes a bushing 158d secured by fastener 158e. Bushing 158d is secured by fasteners 158f to a bracket 115d, which is in turn fastened to beam 16c through fasteners 115e. The actuator arm of servo 158 projects through the other bracket 158b, and includes a bushing 158g mounted at the end thereof. Bushing 158g is connected to shaft 112 through a linkage including brackets 115a and 115b and fasteners 115c, using fastener 158h and sleeve 158j. The linear action of this servo provides rotation around axis 119a (shown in FIG. 7a), which enables the knife blade to be rotated generally along the longitudinal axis of the pork side.

Climb/dive servo 154 and lateral servo 152 are each mounted on a bracket 116 on shaft 112. Bracket 116 includes first and second beams 116a and 116b, and is mounted to shaft 112 by bracket 116c and bolts 116d.

Climb/dive servo 154 is disposed within a compartment 154a, and includes a pair of brackets 154b secured thereto by fasteners 154c. One of brackets 154b includes a bushing 154d secured by fastener 154e. Bushing 154d is secured by fasteners 154f to a bracket 116e, which is in turn fastened to first beam 116a through fasteners 116f. The actuator arm of servo 154 projects through the other bracket 154b, and includes a bushing 154g. mounted at the end thereof. Bushing 154g is connected to bracket 114f on arm 114 by fastener 154h and sleeve 154j. The linear action of this servo provides rotation around axis 119b, which enables the knife blade to be raised and lowered relative to the pork side.

Lateral servo 152 is disposed within a compartment 152a, and includes a pair of brackets 152b secured thereto by fasteners 152c. One of brackets 152b includes a bushing 152d secured by fastener 152e. Bushing 152d is secured by fasteners 152f to a bracket 116g, which is in turn fastened to second beam 116b through fasteners 116h. The actuator arm of servo 152 projects through the other bracket 152b, and includes a bushing 152g mounted at the end thereof. Bushing 152g is connected to a bracket (not shown) on member 114e of arm 114 by fastener 152h and sleeve 152j. The linear action of this servo provides rotation around axis 119c, which enables the knife blade to be displaced laterally relative to the pork side.

Servos 152, 154 and 158 are preferably type S3007 servos manufactured by Reliance Electric. Other known servos or actuators may be used in the alternative.

Turning to FIG. 7c, head assembly 120 provides a fourth axis of motion for loin knife assembly 100, while providing a leading steering coupling therefor to lead a knife blade 121 through the pork side. As discussed above, knife blade 121 is preferably an arcuate, U-shaped, stainless steel blade sharpened on its forward facing edge, which is similar in design to a hand-held loin pulling knife. Knife blade 121 has a first (right) side 121a and a second (left) side 121b.

Head assembly 120 is mounted on head assembly receiving shaft 114a of arm assembly 110 through a pivot block assembly 132. Assembly 132 includes a pivot block 132a which receives shaft 114a through a wear resistant insert 132b that allows pivot block 132a to pivot around shaft 114a. A spring plate 132g mounted to vertical member 114d of arm 114 with fasteners 132h engages pivot block 132a to bias the head assembly to a centered position.

A head bracket assembly 133 is mounted to pivot block assembly 132 by a runner, or horizontal plate, 133a which is secured to pivot block 132a by a fastener 132f projecting through a flanged insert 132e. Left and right brackets 133c and 133f, which are secured to plate 133a by fasteners 133g, are also coupled to pivot block 132a by pins 132c received in wear-resistant inserts 132d fitting into first apertures in the brackets, thereby allowing the head bracket assembly to rotate about a lateral axis defined by pins 132c.

Furthermore, first and second loin knife width servos 156 and 157 are each disposed in a separate compartment 156a and 157a each having access panels 156b and 157b secured by fasteners 156c and 157c, and are mounted respectively to brackets 133c and 133f by fasteners 133h. Servos 156 and 157 are stepper motor servos, such as the S3007 manufactured by Reliance Electric, although other known servos may also be used in the alternative.

As discussed above, pivot block assembly 122 permits lateral and vertical pivoting of the head assembly relative to arm 114, such that head assembly 120 may be steered through a pork side by the forward steering coupling provided by arm 114. This "castering" operation may be controllably inhibited by a locking mechanism 139. As discussed below, the head assembly is preferably locked in position when the starting point of the loin knife cut is being found, then the head assembly is unlocked once cutting begins to permit the blade to be steered through the pork side. Locking mechanism 139 includes a pair of air cylinders 139a which are mounted to member 114b of arm 114 by brackets 139b, 139e and 139f and fasteners 139c and 139g.

A clamping arm 139d is mounted to compartment 157a, and is allowed to slide between the air cylinders 139a when they are not activated. However, when the cylinders are activated, they clamp on to arm 139d to lock the head assembly in a fixed position.

The relative position of head bracket assembly 133 with respect to pivot block assembly 132 is controlled by a climb/dive angle adjustment assembly 137, which includes a threaded stop 137c threadably received in bracket 137a. This bracket is mounted to right bracket 123f through another bracket 137b using fasteners 137d, so that the end of stop 137c engages pivot block 132a. By threading stop 137c in or out of bracket 137a, the unloaded climb/dive angle of knife blade 121 may be set to rotate the knife blade angle in relation to the pivot point centerline through pivot block 132a.

A pair of servo linkage assemblies 134 transfer the rotational motion of servos 156 and 157 into linear width adjustments for each side 121a and 121b of knife blade 121. Each assembly 134 is substantially the same. The primary component of each assembly 134 is a ball screw 134a which is rotatably received in the second apertures in the respective bracket 133c or 133f through bearings 134b.

A first timing pulley is mounted on ball screw 134a, and it includes a gear 134j sandwiched between pulley halves 134h and secured thereto by fasteners 134k. A second timing pulley is mounted on the rotational shaft of the respective servo 156 or 157 through a member 134d. The second timing pulley includes a gear 134f, mounted on member 134d, and sandwiched between pulley halves 134e and secured thereto by fasteners 134g. A timing belt 134c interconnects the first and second timing pulleys, whereby rotation of the respective servo shaft rotates ball screw 134a. A bearing 134l is disposed between the ball screws 134a.

A pair of sliding assemblies 135 are coupled to ball screws 134a and are arranged to slide generally along plate 133a in response to a rotation of the respective ball screw by servo 156 or 157. One assembly 135 is provided for each side of knife blade 121 to allow each side to be adjusted independently. Each includes a slotted member 135a adapted to slide along a flange 133b of plate 133a. A block 135b is mounted to slotted member 135a through fasteners 135c, and a bracket 135d is then mounted to block 135b through fasteners 135g. A threaded member 135e, mounted to bracket 135d by fasteners 135f, then receives one end of the respective ball screw 134a, whereby a rotation of a ball screw causes the respective threaded member 135e to be threaded along the ball screw, resulting in the respective sliding assembly 135 sliding along flange 133b of plate 133a. While sliding assemblies 135 are shown sliding along a single horizontal plate, it will be appreciated that different runners, e.g. shafts, may be used as alternatives to a plate, and further, that each sliding assembly may slide on a separate runner.

Knife blade 121 is mounted at each side to one of the sliding assemblies 135 through separate blade bracket assemblies 136. Each blade bracket assembly 136 includes a recessed member 136a which is rotatably mounted on block 135b of the respective sliding assembly 135 through a pin 136b, thus allowing each side of the knife blade to rotate about a vertical axis defined by pins 136b. Knife blade 121 is secured to a pair of blade brackets 136h and 136j with fasteners 136g. Brackets 136h and 136j are coupled to recessed members 136a through pivot blocks 136c, fastened to members 136a through fasteners 136d, and coupled to brackets 136h and 136j through pins 136e fastened by fasteners 136f. This configuration permits each side of knife blade 121 to individually rotate about the longitudinal axis of pins 136e. Different types of blade fasteners, e.g., quick-connect blade fasteners, may also be used.

Consequently, rotation of either servo 156 or 157 will slide the respective sliding assembly 135 along plate 133a, thereby laterally displacing the respective side 121a or 121b of knife blade 121. Independent lateral adjustment of the sides of the blade are therefore provided.

A hold down assembly 138 is also optionally provided on head assembly 120. Assembly 138 includes a runner 138a which is disposed forward of the first side 121a of blade 121 to spread apart the scribe cut formed by scribe saw assembly 50 during the cutting operation of loin knife assembly 100. It is believed that by spreading apart the cut, the possibility of hitting the ends of the scribed ribs is minimized, thereby improving the loin cutting and lengthening the life of the knife blade. Alternatively, the cut may be spread by dropping down the backbone side of the meat after scribing, either by mechanical means or by simply not supporting the backbone side of the meat during the loin pulling operation.

In operation, loin knife assembly 100 provides four axes of motion for knife blade 121. A first or vertical axis of motion is defined by lateral axis 119b and controlled by a first moving means (servo 154) displacing vertical member 114b of arm 114. This axis of motion provides climb/dive or vertical displacement (i.e., to raise or lower the knife blade).

A second axis of motion is defined by axis 119c and controlled by a second moving means (servo 152) displacing lateral member 114e of arm 114. This axis of motion provides lateral displacement (i.e., to move the knife blade side-to-side).

A third axis of motion is defined by axis 119d and controlled by a third moving means, which includes first and second lateral moving means (servos 156 and 157), independently displacing the sliding assemblies 135 that secure each side of knife blade 121. This motion allows independent adjustment of the lateral placement of each side of the knife blade, thereby enabling the sides to follow separate profiles.

A fourth axis of motion is defined by longitudinal axis 119a and controlled by a fourth moving means (servo 158) displacing shaft 112. This axis of motion provides rotational adjustment of knife blade 121 along a longitudinal axis of the pork side.

Several important features are provided by the preferred construction of loin knife assembly 100. For example, the preferred construction allows for independent control of each side of knife blade 121 by the separate action of servos 156 and 157.

Another important feature of the preferred construction is that the various displacements of the knife blade occur through a steering coupling which "leads" or "steers" the knife blade through the pork side, providing more natural anthropomorphic motions. It will be appreciated that since knife blade 121 is cutting through solid meat, the blade may not simply be moved to any position when desired. In particular, any adjustments to the position of the knife blade must be gradual enough to enable knife blade to work its way to the desired position, otherwise the knife may jam or break, or the pork side may become dislodged from the supporting platen.

In the preferred construction, the knife is located behind the forward point of arm 114, which is head assembly receiving shaft 114a, which provides a forward steering coupling that enables knife blade 121 to operate much the same as a caster. Therefore, any displacement of the head assembly will merely urge the knife blade in the desired direction until the desired displacement is achieved naturally.

This desired motion is further enhanced by the preferred construction due to the multiple pivot points provided for the knife blade. In particular, pivot block assembly 132 allows the entire head assembly 120 to pivot about a lateral axis (i.e., across the width of a pork side) as well as about a vertical axis (i.e., transverse to the plane of the pork side). Furthermore, recessed members 136a enable each side of the knife blade to separately pivot slightly about a vertical axis, and pivot blocks 136c enable each side of the knife blade to separately pivot about a longitudinal axis (i.e. along length of pork side). The combination of these pivot points gives the knife blade the freedom to be steered to the desired positions as it cuts through the pork side. In addition, since the knife blade is substantially freer than many conventional designs, it is believed that jamming and breaking of the blade will be reduced since the knife blade will not be as likely to be forced to follow a path beyond its structural capabilities.

The freedom of movement of provided by the multiple pivot points in the preferred loin knife assembly may be adjusted as necessary (e.g., through springs or other counterforce mechanisms) to balance the controllability of the knife blade (which ensures proper positioning thereof) with the flexibility of the knife blade (which ensures more fluid motion and easier passage through a side of meat). Moreover, an alternate embodiment of the loin knife assembly may have the multiple-pivot points locked in place, or eliminated altogether, to provide maximum controllability for the knife blade. For example, FIG. 7c shows an optional locking mechanism 131 which uses a threaded rod 131a having bushing ends 131b to lock the pivot points on the head assembly. The rod is connected at one end by a fastener 131e to a bracket 131c fastened to the head assembly with fasteners 131d. The rod is connected at the other end by a fastener 131e to a bracket 131g fastened to another bracket 131f by fasteners 131k. Bracket 131f is in turn mounted to shaft 112 by bracket 131h and fasteners 131j.

Several modifications may be made to the preferred construction of the loin knife assembly consistent with the invention. For example, other mechanisms for moving the blade sides on a head assembly (e.g., as an alternative to ball screws and sliding assemblies) may be used, such as pivoting assemblies or alternate mechanical linkages. However, it is believed that the preferred construction would be simpler, less expensive and would remain more balanced regardless of the particular orientation of the knife blade.

In addition, the loin knife assembly may provide fewer axes of motion, e.g. by eliminating rotational control or lateral arm control (i.e., servos 152 and 158), since the combination of the vertical arm adjustment and the individual lateral adjustments of the knife blade sides provides a significant amount of control over a loin pulling operation. To this extent, universal joint 113 may be eliminated if lateral arm adjustments are not used. However, it is believed that with the preferred configuration, sophisticated, yet natural anthropomorphic knife blade motion may be obtained with less complexity and with greater flexibility.

Figure 8:
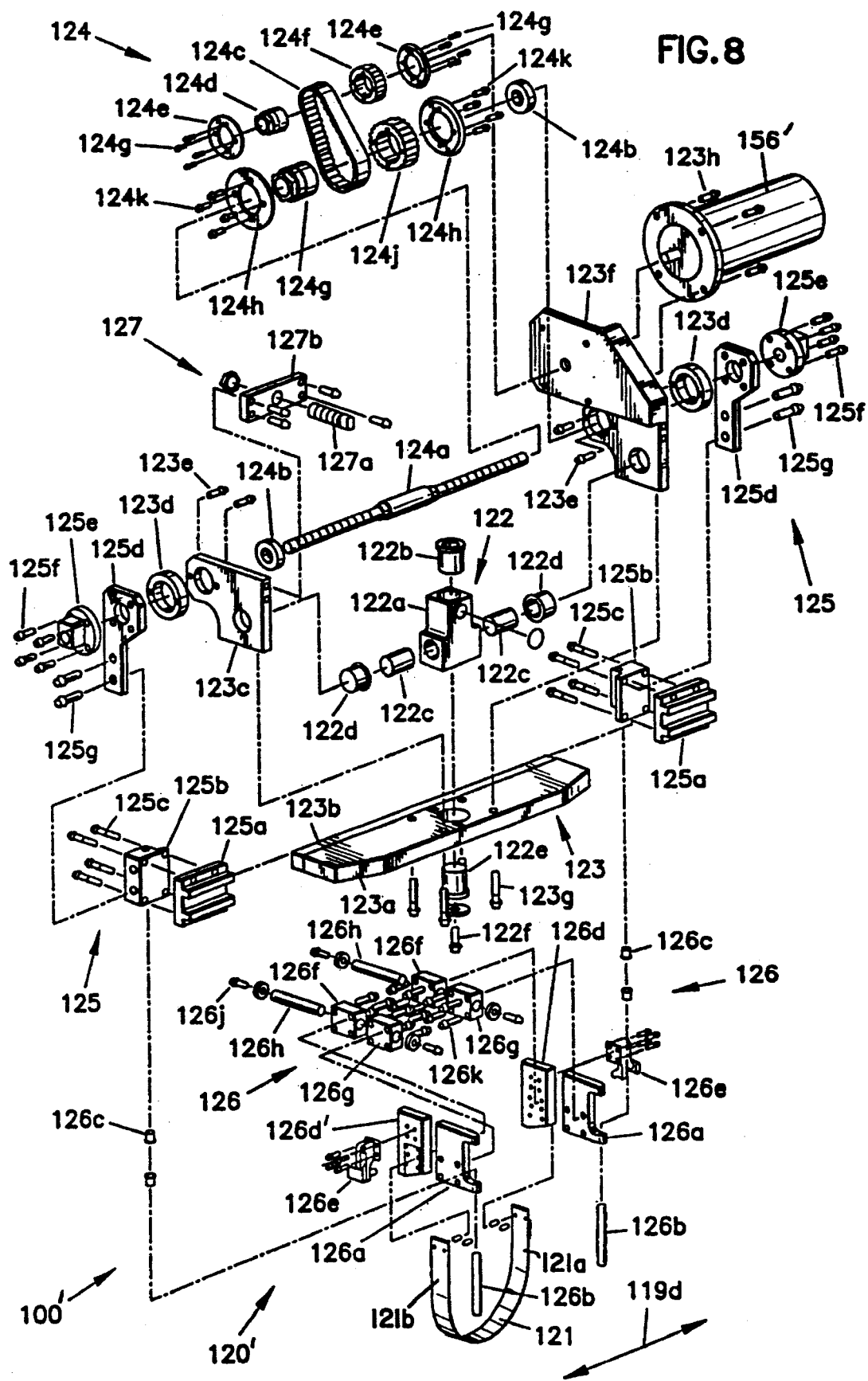
FIG. 8 is an exploded perspective view of an alternate loin knife head assembly consistent with the invention.

FIG. 8 shows one alternative head assembly design 120' which may be used as an alternative to assembly 120 in FIG. 7c. Instead of including two separate servos for independently adjusting the sides of blade 121, assembly 120' includes a single servo 156' which varies the separation between the blade sides to control the width of the knife blade. Through the combination of width adjustment of the blade using servo 156' and lateral adjustment of the arm servo 156', first and second lateral moving means may still be defined to respectively control the sides of blade 121 to follow separate profiles which are generally independent from one another.

Head assembly 120' includes a pivot block assembly 122 which includes a pivot block 122a receiving shaft 114a of arm 114 through an insert 122b. A head bracket assembly 123 is mounted to pivot block assembly 122 by a horizontal plate 123a secured to pivot block 122a by a fastener 122f projecting through insert 122e. Left and right brackets 123c and 123f, which are secured to plate 123a by fasteners 123g and include spacers 123d, are also coupled to pivot block 122a by pins 122c received in inserts 122d. A loin knife width servo 156' is mounted to right bracket 123f by fasteners 123h.

The relative position of head bracket assembly 123 with respect to pivot block assembly is controlled by a climb/dive angle adjustment assembly 127, which includes a threaded stop 127a threadably received in bracket 127b mounted to the edges of brackets 123c and 123f, so that the end of stop 127a engages pivot block 122a.

A servo linkage assembly 124 includes a single double threaded ball screw 124a which is rotatably received in brackets 123c and 123f through bearings 124b. A first timing pulley, including a gear 124j sandwiched between pulley halves 124h and secured thereto by fasteners 124k, is mounted on ball screw 124a through a member 124g. A second timing pulley, including a gear 124f sandwiched between pulley halves 124e and secured thereto by fasteners 124g, is mounted on the rotational shaft of servo 156' through a member 124d. A timing belt 124c interconnects the first and second timing pulleys, thereby rotation of the servo shaft rotates ball screw 124a.

A pair of sliding assemblies 125 are used, each including a slotted member 125a adapted to slide along a flange 123b of plate 123a. A block 125b is mounted to slotted member 125a through fasteners 125c, and a bracket 125d is then mounted to block 125b through fasteners 125g. A threaded member 125e, mounted to bracket 125d by fasteners 125f, then receives one end of double threaded ball screw 124a. Threaded members 125e are preferably equidistant from the center of the ball screw to maintain sliding assemblies 125 evenly spaced from center of head assembly 120 to better balance loin knife assembly 100.

Knife blade 121 is mounted at each side to one of the sliding assemblies 125 through blade bracket assemblies 126. Each blade bracket assembly 126 includes a recessed member 126a rotatably mounted on block 125b of sliding assembly 125 through a pin 126b. A blade bracket 126d, including a blade fastener 126e mounted thereon for retaining the side of knife blade 121, is coupled to recessed member 126a through pivot blocks 126f and 126g fastened to the respective members by fasteners 126k. The pivot blocks 126f and 126g are in turn coupled together by a pin 126h fastened at each end by fasteners 126j.

Other modifications to the loin knife assembly, will be appreciated by one skilled in the art.

D. Electronic Control System

FIG. 9 shows a block diagram of the preferred electronic control system 170. The primary components of control system 170 are a main controller 172, a motion controller 180 and an imaging/vision system 190.

Main controller (host PC) 172 provides the primary control over control system 170. In particular, controller 172 coordinates the activities of motion controller 180 and imaging system 190 to actuate apparatus 10 to perform the loin separation processes. Cutting profiles for the scribe saw and loin-pulling assemblies are preferably generated in controller 172 in response to image data provided by imaging system 190. Then, after profiles are calculated, controller 172 also communicates with motion controller 180 to coordinate the actions of scribe saw assembly 50 and loin knife assembly 100 as a side is conveyed through the apparatus. Moreover, controller 172 controls a number of secondary components through a secondary driver 161.

Controller 172 also provides a user interface for operating, programming, modifying, diagnosing, etc. apparatus 10. Diagnostic information, as well as production data, may also be stored in controller 172. Other system overseeing functions may also be incorporated into controller 172.

Controller 172 is preferably an IBM® Compatible personal computer, such as the type based upon an Intel® 486 or Pentium microprocessor. It will be appreciated, however, that other computer systems, either commercially available or custom designed, may be used in the alternative.

Controller 172 communicates with imaging system 190 through a dedicated bus 174, which is preferably a standard EISA bus on an IBM-compatible PC. The primary function of imaging system 190 is to provide imaging data and digital image processing to controller 172 for determining the necessary modifications to pre-programmed scribe and loin pull profiles based upon the dimensions of the pork side. In the preferred control system 170, imaging system 190 provides both static and dynamic information about pork sides to assist in optimizing the scribe and loin pulling operations.

Imaging system 190 includes a visioning processor, preferably a Matrox Visioning System Model IM-640, manufactured by Matrox Electronic Systems, Ltd. of Quebec, Canada. Other commercially available imaging systems may be used in the alternative. In the Matrox system, a baseboard 192 includes a pair of processors. The first, a graphics signal processor, handles information exchange with controller 172, controls the overall visioning processor system, supervises the parallel processing functions for the system, and controls the imaging cameras which provide the images of each side of pork. The second, a floating point unit, performs specialized and processor-intensive numerical operations to support the graphics signal processor.

An internal proprietary image bus 191 in the Matrox system handles information exchange between baseboard 192 and a real time processor 194. Real time processor 194 provides several standard image processing routines, including routines for neighborhood processing (e.g., edge detection, filters and convolutions), spatial filters, pattern matching convolutions and thresholding, among others.

As discussed above, baseboard 192 of imaging system 190 controls several cameras that provide image data regarding each side of pork processed by apparatus 10: a top plan camera 196, an end view camera 197 and a fat line camera 198. The first, top plan camera 196, is primarily used to determine the primary physical dimensions and characteristics of a side for generating the profiles for the scribe saw and loin knife assemblies.

As shown in FIG. 1, top plan camera 196 is positioned directly above platen 20 in the loading position, whereby a top plan image of the pork side may be captured immediately after the platen is activated and the pork side is securely positioned thereon. A plurality of lights 140 are positioned proximate platen 20 and are angled to project a high intensity light against the top surface of the pork side. At the angle shown in FIG. 1, about 35 degrees from horizontal, it has been found that the light creates a particularly strong shadowline directly along backbone due to the typical contours of a pork side, to the extent that a binarized (or digitized) image of the pork side taken with camera 196 will have a brightly lit (white) area for the ribs, with a dimly lit (black) area for the backbone. As such, the imaging system has little difficulty in determining the positioning and curvature of the backbone therefrom. It will be appreciated, however, that other positioning for lights 140 may also be used in the alternative, given the pattern matching capabilities of the preferred imaging system. Further, as will be discussed below, it may be preferable to take a second image with camera 196 while lights 140 are not on, to gain additional dimensional data regarding the pork side.

The second imaging camera, end view camera 197, is primarily used to determine the height of the pork side and the positioning of the "T"-shaped blade bone of the pork side on the leading surface thereof, both for aiding in the calculation of starting points for the loin knife and scribe saw profiles. As shown in FIG. 1, camera 197 is preferably positioned proximate scribe saw assembly 50 and angled forward to view the leading end of the pork side when platen 20 is in a loading position prior to the scribing operation. Light source 140 may be used to project high intensity light on the top surface of the pork side to create a clear delineation along the top edge of the end of the pork side. Again, two images may be taken, one with the lighting and one without, to obtain the preferred image data for generating the assembly profiles.

The third imaging camera, fat/lean separation line camera 198, is primarily used to provide dynamic (real-time) image data of the fat/lean separation line for the pork side proximate the backbone. Controller 172 uses this information to dynamically modify the cutting profile of loin knife assembly 100 so that the assembly follows a fixed distance from the separation line to provide the optimum fat cover for the loin. As shown in FIG. 1, camera 198 is preferably positioned proximate loin knife assembly 100 facing inwardly. Preferably, the field of view of camera 198 is adjusted to focus on the positioning of the fat/lean separation line within a relatively small area so that the image data may be coordinated with the small incremental movements of the platen.

Cameras 196, 197 and 198 are preferably GP-MS112 cameras manufactured by Panasonic, although other cameras suitable for this purpose are available. The magnification, focus and sensitivity of each may be optimized for the different applications of the cameras, e.g., for camera 196, the field of view is preferably the entire top surface of the pork side, for camera 197, the field of view is preferably just the end surface of the pork side, and for camera 198, the field of view is preferably a small area of the fat/lean separation line which is a known distance from the loin knife assembly.

It has been found that certain types of supplemental lighting may also be used to enhance the imaging capabilities of imaging system 190. For example, as shown in FIG. 1, a pair of lighting systems 302 and 304 may be used to provide overall illumination of a pork side during imaging. In particular, lighting systems 302 and 304 are preferably mercury vapor lamps, which have been found to possess light wavelengths that accentuate the interface between fat and lean on a pork side. In particular, light wavelengths in the order of 380 to 760 nanometers are preferred (more preferably about 550 to 600 nanometers), which may be provided by different lighting systems, such as those manufactured by General Electric, Stonco, etc. Lighting systems 302 and 304 may be continuously on during the operation of apparatus 10, or alternatively, may be turned on and off (or selectively shielded)to operate only during the imaging cycles of apparatus 10.

One skilled in the art will appreciate that various connections, peripheral components, etc. may be necessary to drive cameras with visioning system 190. Furthermore, it will be appreciated that the programming and data exchange necessary for controller 172 to communicate with and control an imaging system in the manner described herein is generally known in art, for example as exemplified by the Matrox IM 640 IMAGE Series Programming Manual, which is incorporated herein by reference.

Returning to FIG. 9, controller 172 also communicates with a motion controller 180 through a dedicated bus 173, which is also preferably a standard EISA bus on an IBM-compatible PC. The primary function of motion controller 180 is to control the different servos used in the scribing and loin pulling operations. Controller 172 provides the desired positioning data (profile) for each servo to motion controller 180 on a real-time basis during cycling of apparatus 10.

Motion controller 180 preferably includes a PMAC Programmable Multi-Axis Controller, manufactured by Delta Tau Data Systems of Northridge, Calif. Other known motion controllers may also be used in the alternative. Motion controller 180 also includes an internal bus 182, driven by the PMAC Controller, which communicates with a plurality of servo drivers, each of which drives one of the servos, which include scribe saw lateral servo 150, scribe saw lift actuator 151, loin knife arm lateral servo 152, loin knife climb/dive servo 154, first and second loin knife blade lateral servos 156 and 157, loin knife rotational servo 158 and platen position servo 160. The preferred servo drivers are Electro-Craft BRU-200 Servo Drivers manufactured by Reliance Electric. This type of servo driver accepts +/−10 VDC Analog signals; consequently, it will be appreciated that the PMAC Controller and internal bus 182 will include all necessary amplifiers, buffers, and other peripheral components for providing suitable control signals to each servo driver. In addition, it will be appreciated that the programming and data exchange between main controller 172 and motion controller 180 is generally known in the art, for example as exemplified by the Delta Tau Version 1.13 PMAC Reference Manual by Data Systems, Inc., which is incorporated herein by reference. It will further be appreciated that different modifications may be made to the preferred design, and that other motion controllers known in the art may also be used.

Main controller 172 also controls several peripheral components through a secondary driver 161 across a bus 176. Most components are valves for pressure driven devices in apparatus 10, such as Model 082SA415M LS3BA452B solenoid valves manufactured by Numatics, Inc. For example, controller 172 preferably controls valves 350 and 352 between an air pressure source (not shown) and the outer and inner gripper hook cylinders. Further, another valve 166 supplies a source of pressure to the scribe saw blade driving means to drive the blade during the scribing operation. Also, another air valve is driven by controller 172 to actuate push-off cylinder 162 to eject loins from apparatus 10. Moreover, a pair of air valves are driven by controller 172 to actuate the scribe saw and loin knife locking mechanisms 87 and 139 for selectively locking the steering couplings of the respective assemblies.

Secondary driver 161 may also be used to receive a signal from an operating switch 17. As shown in FIG. 1, switch 17 is used by an operator to activate apparatus 10 to initiate a loin separation cycle. Preferably, switch 17 is of the type which will initiate a cycle on when the operator is clear of machine, primarily for safety reasons. One type of device suitable for use as switch 17 is an OTDVNG switch manufactured by Banner Engineering Corp., which will not initiate a cycle until both of an operator's hands on placed on separate infrared sensors. Other suitable safety actuation switches are known in the art.

Returning to FIG. 9, other inputs and outputs may be routed through to secondary driver 161 as desired. Further, different buffers, relays, amplifiers, A/D or D/A converters and other peripheral components may be necessary for allowing controller 172 to send and receive signals from the devices interfaced through driver 161. Other modifications and changes may be made to driver 161 as desired.

Various modifications and changes may be made to control system 170 consistent with the invention. For example, additional imaging and motion functionality may be included to provide more sophisticated profiles using the preferred scribe saw and loin knife assemblies. Also, the design of control system 170 may be modified to incorporate different accessory components on apparatus 10. Other modifications will be appreciated by one skilled in the art.

E. Operation/Software Configuration

With the preferred design of apparatus 10 as discussed above, a pork side may be separated into the pork loin and pork belly portions with substantially greater accuracy and efficiency. As shown in FIGS. 10a–c, a typical pork side 1 includes a backbone 7 which follows a generally curving profile viewed from above. A fat/lean separation line 6 is shown along the outer edge of pork side 1 when viewed from the top and end views, and a "T"-shaped blade bone 5 is shown viewed from the end of pork side 1.

The desired scribe saw cut is designated by line 2. It is preferable to cut the ribs as close as feasible to the backbone, preferably along a line which is separated from backbone 7 by about 1¼ inch and which follows the general contour of the backbone. The preferred depth of scribe cut 2 is about ½ inch, which is sufficient to sever the ribs. Moreover, in the preferred embodiment, it is desirable to stop the scribe cut as soon as possible after the last rib is cut to minimize the amount the scribe saw cuts into the tenderloin area following the rib, which could otherwise decrease the quality of the pork side.

The general profile of the loin knife preferably simulates the motions of a human operator. At the entry point into the pork side, the right side of the knife blade 121 enters at the scribe cut, and the left side of the blade preferably enters 0.1 inches from the fat/lean separation line. The bottom of the blade enters below the "T"-shaped blade bone.

The desired loin pull cut is shown by lines 3a, 3b and 4, which respectively show the preferred paths for the right side, the left side and bottom of knife blade 121 (when facing the sharpened edge of blade 121). The right side 121a of knife blade 121 preferably follows scribe cut 2 along line 3a. The left side 121b of knife blade 121 preferably follows line 3b, which is a fixed distance (preferably 0.1 inch) from fat/lean separation line 6, and which generally follows the contour thereof. As discussed above, a 0.1 inch fat covering sufficiently keeps the loin from drying out, but doesn't make the loin look too fat. Other fat thicknesses may be desired in the alternative. The bottom of knife blade 121 also generally follows line 4 (shown in FIG. 10b), which generally travels below blade bone 5 proximate the fat/lean separation area along the bottom of the pork side.

In addition, it may be desired to cause the profiles of the left and right sides and the bottom of blade 121 to dive and flare out, typically a fixed distance after point 9 (FIG. 10a), which maximizes the amount of ham pulled with the loin and misses the aitch bone. As the blade dives and flares out; however, it is preferable to control the left side of the blade to follow the fat/lean separation line throughout the entire profile.

Figure 11:
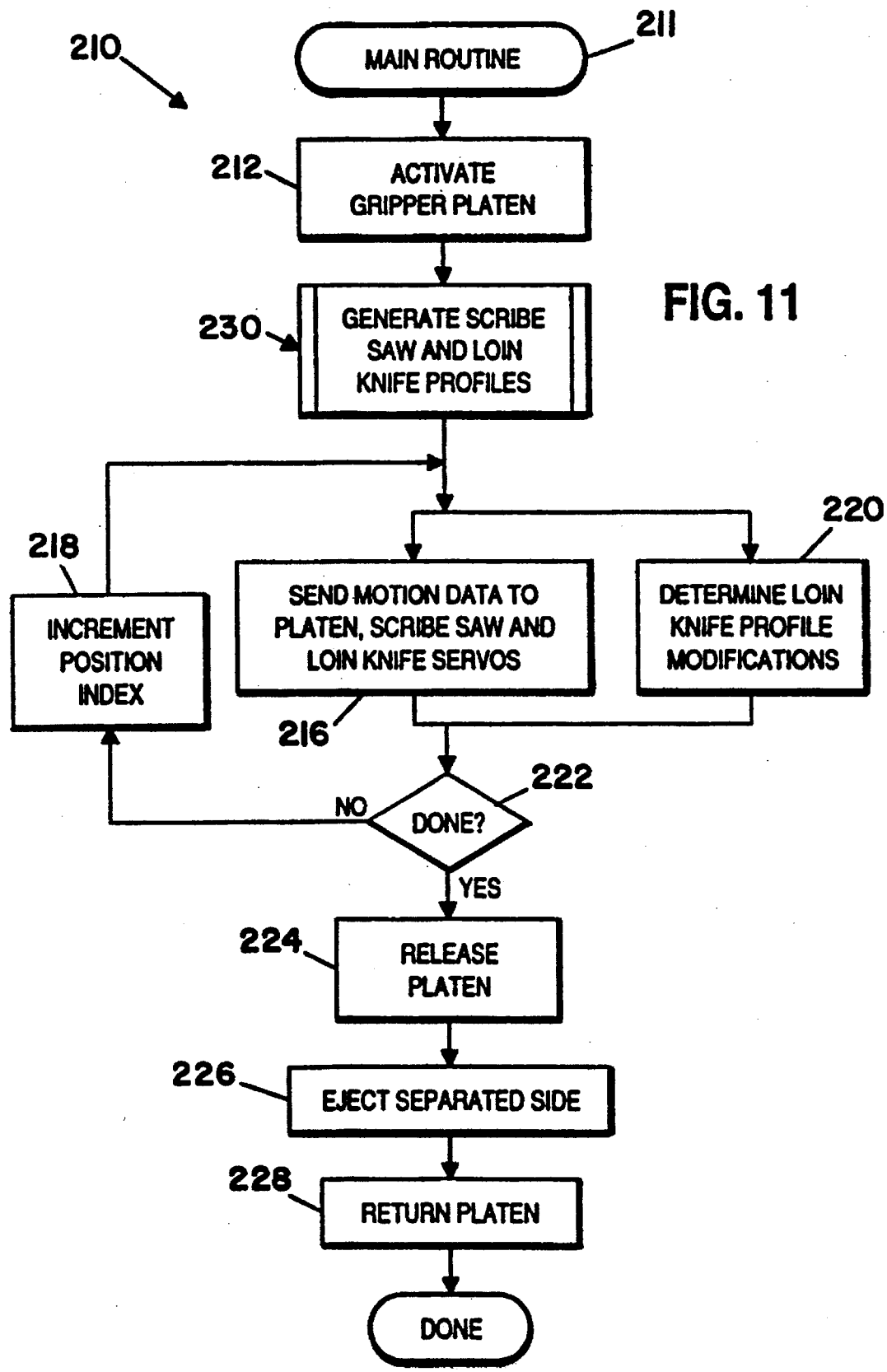
FIG. 11 is a flowchart showing the processing steps for separating a pork loin with the control system of FIG. 9.

FIG. 11 shows a flowchart for the software control of a preferred operating cycle 210 for apparatus 10. The preferred cycle is initiated in block 211 by an operator activating switch 17 when the operator has properly positioned a pork side on the platen. It will be appreciated that a pork side may alternatively be placed on the platen by automated devices such as conveyors, robotic arms, etc.

The first step in the cycle is to activate gripper platen 20 in block 212. This step includes sending the appropriate signals to secondary driver 161 as discussed above to first activate valve 350 for the outer gripper hooks and subsequently activate valve 352 for the inner gripper hooks.

Once the pork side has been secured to the platen, control passes to block 230 to determine the preferred profiles for scribe saw assembly 50 and loin knife assembly 100. The profiles for the assemblies are stored as separate arrays of data points. Each array corresponds to one of the servos, and preferably includes 133 data points indexed by a common position index variable which may correspond to the position of platen 20 (e.g., where there are 133 evenly spaced positions for the platen along the rails). The profile generating routine is discussed in greater detail below with respect to FIGS. 12, 13 and 14.

The profiles are transmitted to motion controller 180 by the program loop shown in blocks 216–222. Upon initiation of routine 210, the position index will preferably be set to index the beginning data points in the profile arrays. In block 216, the profile data according to the current position index is transmitted to motion controller 180 to activate each servo according to the programmed profile data. In this block, motion data for scribe saw assembly 50, loin knife assembly 100 and platen 20 are provided to controller 180, and further, control signals are provided to secondary driver 161 to operate the secondary components as necessary (e.g., to turn the scribe saw blade on/off, to raise/lower the scribe saw assembly, to unlock the steering couplings once the scribe saw and loin knife have entered the pork side, etc.).

Motion controller 180 preferably takes the data points provided by controller 172 and fits these points to curves for activating the individual servo drivers. This enables motion controller 180 to ensure for proper positioning of the servos at periodic intervals, taking into account the time delays present when moving electromechanical servos. This also enables the scribe saw and loin knife blade to be steered progressively through the pork side by their respective forward steering couplings. Motion controller 180 preferably operates in a known spline mode, whereby the data points are fit to an arcuate curve between points. It will be appreciated that the motion controller may also operate in other modes such as a linear mode.

Concurrent with block 216, in block 220, a separate dynamic profile modification routine executes to image the fat/lean separation line of the pork side using camera 198 and make real-time adjustments to the profile of the loin knife assembly, as will be discussed in greater detail below. In general, the data modified in the profile is preferably separated in time from the data being transmitted to the motion controller, so no data conflicts will occur.

In block 222, the position index variable is queried to determine if the end of the profile has been reached. If not done, control is passed to block 218 to increment the position index and return to execute blocks 216 and 220 for the next position index value.

Routine 210 provides a set of data points on a periodic basis to motion controller 180, preferably about every 0.5 inches of movement of platen 20. With the movement of platen 20 separated into 133 datapoints, this preferably enables the platen to be cycled through apparatus 10 in about 7 seconds. Including the time for activating, returning and releasing the platen, initial imaging, and final loin ejection, as well as the operator time for loading a pork side on the platen, it is anticipated that the preferred apparatus 10 should be able to process about 450 pork sides per hour.

Returning to block 222, if all of the profile data has been transmitted to motion controller 180, then control is passed to block 224 to release the inner and outer gripper hooks by deactivating valves 350 and 352. Next, in block 226, the scribed and separated pork side is ejected from apparatus 10. In this block, push-off cylinder 162 is activated and withdrawn to eject the pork side from platen 20 into a hopper or bin, or alternatively onto another conveyor (not shown) for further processing. Then, once the pork side is ejected, control passes to block 228 to return the platen to its starting position, preferably by resetting the position of the platen to its beginning point, and sending this information to motion controller 180, which steps the platen back to its start position.

Figure 12:
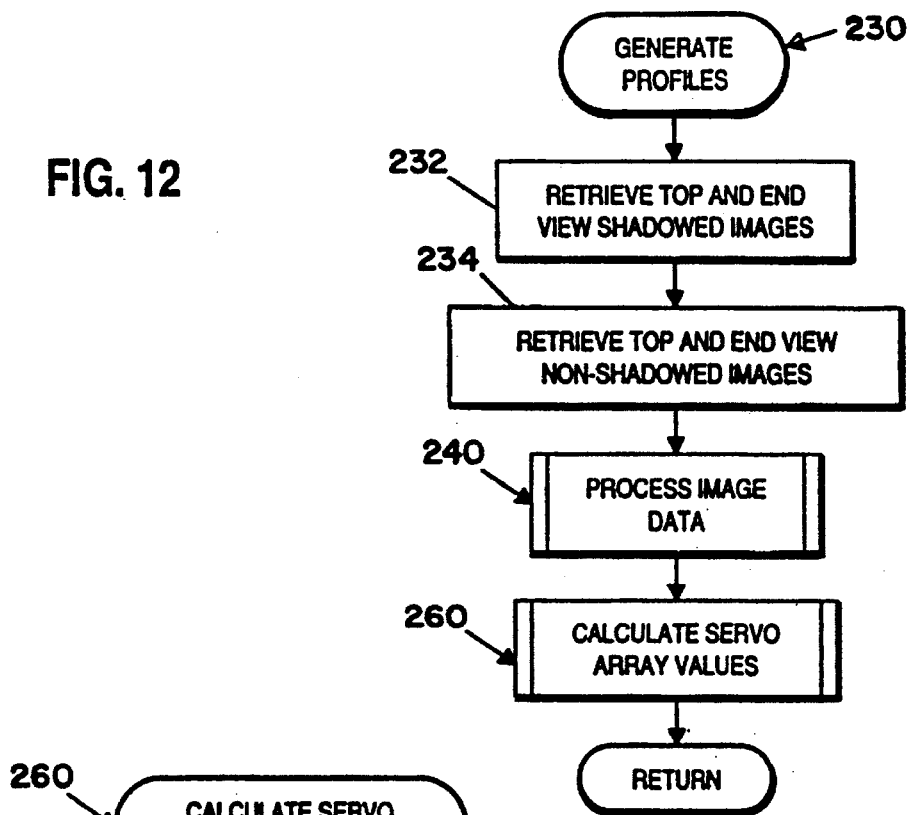
FIG. 12 is a flowchart showing the GENERATE PROFILE routine from FIG. 11.

FIG. 12 shows the overall flow in the preferred profile generating routine 230. In routine 230, two separate images are preferably taken for top and end views of the pork side in blocks 232 and 234. In block 232, top and end views are taken by cameras 196 and 197 with lights 140 activated to create shadowed top and end images of the pork side. With the high intensity lighting provided by lights 140, a definitive backbone line will be generated in the top image, and a definitive top edge will be generated in the end image.

In block 234, similar non-shadowed top and end view images are taken using cameras 196 and 197 without the high intensity lighting of lights 140. These images provide comparatively more detail of the top and end views of the pork side than their shadowed counterparts, and are used to supplement the image data which may be obtained about the pork side. In the alternative, all of the necessary image data may be obtained from non-shadowed images; however, it is believed that the stark contrasts provided by the shadowed images result in simpler and more reliable detection of some dimensional aspects of the pork sides.

Once the images are taken in blocks 232 and 234, the images are then processed in a image processing routine 240, which is shown in greater detail in FIG. 13. The first step in routine 240 is to generate a backbone line from the top view shadowed image taken by camera 196 in block 242. Block 242 operates via known image processing techniques, primarily by performing noise reduction, then performing a threshholding operation to binarize the image (i.e., to turn all of the pixels therein to black or white, based upon a comparison with a predetermined median value), and the performing a convolution operation to detect the boundary formed by the backbone. The resulting processed image will include a line which follows the backbone of the pork side.

Next, in block 244, routine 240 preferably performs pattern matching operations to generate several points from the processed image. A plurality of points (with corresponding x and y positions) are generated along the backbone line in the processed image. Preferably, 20 points are generated, although more or less may also be generated if desired. Also, a slope change point is calculated, which represents the point along the backbone line in which the slope of the line changes from negative to positive. Further, a "corner" point (point 8 in FIG. 10*a*) is calculated via comparison with a known pattern, to find the general corner of the backbone line and the front end (i.e., the end viewed by camera 197) of the pork side.

Next, in block 246, routine 240 generates a fat/lean separation line and an edge line from the non-shadowed top view image. Similar to block 242, noise reduction, thresholding and convolution are performed on the non-shadowed image to generate both lines. However, it will be appreciated that due to the different lighting, different control variables, e.g., the threshold variable, from the variables used on the shadowed image will be required to generate the fat/lean separation and edge lines from the non-shadowed image. In general, the fat/lean separation line will be distinguished by the interface between the loin meat and the fat covering, which is typically much lighter than meat. Similarly, the edge line (representing the outer surface of the pork side proximate the fat/lean line) will be distinguished by the interface between the fat covering and the platen or other supporting structure proximate the edge of the pork side.

Next, in block 248, a plurality of points (preferably 20) are generated for each of the fat/lean separation and edge lines using known pattern matching routines. Further, corner points, representing the ends of the lines at the end surface of the pork side, are also matched and determined for each line.

In block 250, the shadowed end view image is processed to generate a top edge line similar to the manner discussed above for the backbone line in block 242. In particular, known noise reduction, threshold and convolution routines are performed to generate a top edge line along the interface of the top and end surfaces of the pork side.

In block 252, the corner point (point 8 in FIGS. 10*a* and 10*c*) is detected via a pattern matching routine. The corner point corresponds to the same corner point determined in block 244.

Next, in block 254, the non-shadowed end view image is processed to generate end views of the fat/lean separation and the side edge of the pork side, to respectively generate end fat/lean and end edge lines. Also, in block 254, an image of the "T"-shaped blade bone is generated in the processed image. Similar to block 246, noise reduction, thresholding and convolution are performed on the non-shadowed image to generate the desired image components, using suitable control variables. In general, the end fat/lean separation line will be distinguished by the interface between the loin meat and the fat covering, and the end edge line (representing the outer surface of the pork side proximate the fat/lean line) will be distinguished by the interface between the fat covering and the platen or other supporting structure proximate the edge of the pork side. Moreover, the blade bone interface will be distinguished by the interface between the loin meat and the bone, since bone is typically much lighter than meat.

In block 256, a plurality of points (preferably 20) are generated for each of the end fat/lean separation and end edge lines using known pattern matching routines. Further, the bottommost point of the blade bone is also calculated by pattern matching, since the blade bone has a distinctive "T" shape.

The aforementioned noise reduction, thresholding, convolution and pattern matching routines are preferably standardized routines provided with imaging system 190. Further, the particular process control variables, e.g., patterns, threshold values, etc. may vary depending upon several factors, including lighting intensity and type, type of meat, etc. Therefore, the particular process control variables used in the preferred embodiment will not be discussed herein, as they may be determined through routine experimentation.

An additional step is performed in routine 240 before returning to routine 230. In block 258, the height, width and length of the pork side is calculated, using the known values calculated in the aforementioned image processing steps, as well as knowing the position of stop 305 on platen 20, which indicates the position of the opposite end of the pork side. It may also be preferable to compare the calculated widths obtained from the top and end view images for error detection. It will be appreciated that given a known positioning, magnification, and other process characteristics of the image cameras, X and Y coordinates in the top and end view images may be translated to real-world dimensions by a straightforward numerical conversion routine.

The distance from camera 197 to the end of the pork side will typically vary depending upon the length of the pork side. Consequently, the translation between the X and Y coordinates of the image and the real-world dimensions may vary to an extent by the distance from the camera to the pork side. Therefore, it may be preferable to include one or more look-up tables, e.g., indexed by the length or width determined from the corner point in the top view image, to vary the translation of image coordinates to real world dimensions for the end view image. A similar translation may also be used for the top view image.

In block 258, it may also be preferable to calculate a separate height for the ribs in addition to the height of the backbone. This information may also be obtained by pattern matching the shadowed end view image to find the desired point along the ribs to take the height.

Returning to FIG. 12, the next step in routine 230 is to execute routine 260 to calculate the array values for each of the scribe saw, loin knife, and platen position servos. As discussed above, loin knife arm lateral servo 152, climb/dive servo 154 and first and second blade lateral servos 156 and 157 provide three axes of control for each side of the knife blade in loin knife assembly 100. The positioning of these servos is stored generally as a function of the position of the platen, i.e., the motion data for each servo is stored in a numerical array indexed by the position index (which is also used to index or map a numerical array for the platen position servo).

In the preferred apparatus 10, a separate profile for rotational servo 158 is not calculated (i.e., servo 158 is not activated during a loin pulling operation). However, it will be appreciated that a separate profile for servo 158 may be calculated in a manner similar to those for servos 152, 154 and 156 to provide a fourth axis of control for loin knife assembly 100, and thereby provide greater flexibility and/or simulation of anthropomorphic movement for the assembly. In addition, it will be appreciated that due to the independent lateral adjustments available from servos 156 and 157, a separate profile for arm lateral servo 152 may not be required.

The data for the positioning of each servo will be dependent upon the dimensions of knife blade, and it will be appreciated that the data for each servo may be calculated using known equations depending upon the dimensions and desired position of the knife blade, as well as the known physical displacements for each step of each servo. For example, the height of the bottom of the blade 121 may be calculated by a known parabolic geometric equation given the known fixed length of the blade (which forms a perimeter for the parabola) and the controlled and known lateral positions of the sides of the blade. Since lateral adjustments to each side of the blade will vary the width of the blade and necessarily affect the height of the bottom of the blade, the climb/dive adjustment may also be calculated from the known dimensions of the knife blade.

Figure 14:
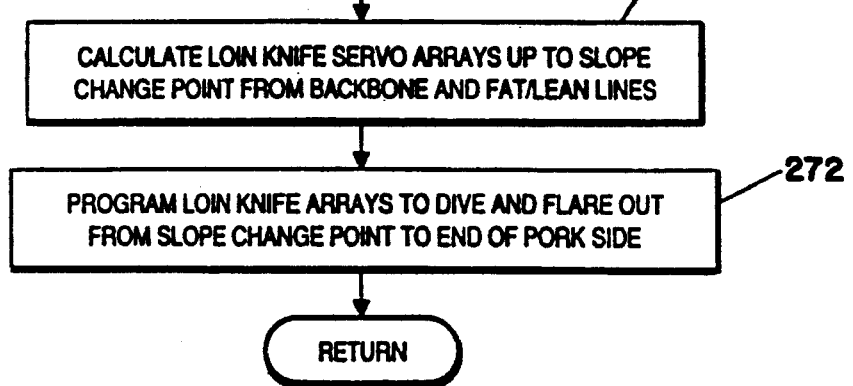
FIG. 14 is a flowchart showing the CALCULATE SERVO ARRAY VALUES routine from FIG. 12.

Routine 260 is shown in greater detail in FIG. 14. In routine 260, the first step is to calculate the individual servo starting points in block 262. As discussed above, it is preferable to control servo 150 to start the scribe saw at a preset distance (preferably 1¼ inch) from the corner point on the backbone line generated in routine 240. Moreover, it is preferable to control servos 152, 154, 156 and 157 to locate the right side of the loin knife blade along the scribe cut, locate the left side of the loin knife blade 0.1 inch from the corner point of the fat/lean separation line generated in routine 240, and locate the bottom of the loin knife blade 0.1 inch from the end fat/lean separation line generated in routine 240.

Next, in block 264, the location of the blade bone is checked to determine whether the bottom of the blade bone projects into the fat cover of the pork side. In some pork sides, this may be the case, and could cause the standard starting point generation routine in block 262 to cause the bottom of the knife blade to hit the blade bone. This comparison may be performed by comparing the end fat/lean separation line to the bottom point of the blade bone, both of which were previously calculated in block 256.

If the blade bone does project into the fat cover of the pork side, control preferably passes to block 266 to modify the starting points of servos 152, 154, 156 and 157 to lower the starting point of the bottom of the knife blade to miss the blade bone. For example, the bottom of the knife blade may be controlled to be located a fixed distance from the bottom of the blade bone.

Next, in block 268, the profile data for servo 150 is generated using the plurality of points generated for the backbone line in routine 240, as well as the slope change point determined in the same routine. The profile of scribe saw lift actuator 151 is preferably generated to lower the scribe saw near the beginning of the profile array (prior to the saw blade hitting the pork side), so that the height of the scribe saw will be automatically controlled by the runners on the scribe saw head assembly. Also, servo 150 preferably follows at a fixed distance from the contour of the backbone line up to the last rib (which is determined as a fixed distance from the slope change point of the backbone line). After the last rib, scribe saw lift actuator 151 is preferably programmed to raise the scribe saw, and the profile of servo 150 may be generated to center the scribe saw for the remainder of the processing of the pork side. Moreover, a profile for the scribe saw locking mechanism 87 may be generated to lock the steering coupling up to the point at which the scribe saw blade enters the pork side, then to unlock the steering coupling thereafter to allow for the "castering" operation of the steering coupling to take effect.

In block 270, the profiles of loin knife servos 152, 154, 156 and 157 are controlled up to the slope change point on the generated backbone line. The profiles of the right and left sides of the knife blade are selected to follow fixed distances from the backbone line and the fat/lean separation line, respectively, and the profile data for servos 152, 154, 156 and 157 are generated accordingly. Moreover, a profile for the loin knife locking mechanism 139 may be generated to lock the steering coupling up to the point at which the loin knife enters the pork side, then to unlock the steering coupling thereafter to allow for the "castering" operation of the steering coupling to occur.

Next, in block 272, the profiles of the loin knife servos 152, 154, 156 and 157 are controlled to dive and flare out the sides of the knife blade at a substantially constant rate so that the width of the blade is proximate a maximum width and the bottom of the blade is at a low point once the end of the pork side is reached. During this period, however, the left side of the knife blade is still controlled to follow the fixed distance from the fat/lean separation line throughout the remainder of the loin pulling process.

Various modifications to the aforementioned profile generation routine 230 may be made consistent with the invention. For example, standard profiles for the scribe saw and loin knife assemblies, which may be determined empirically, may be used and modified (for example, by determining lateral or height offsets from the standard profiles) based upon the images obtained from the imaging system. In this configuration, the motion controller would preferably include a learning setup, whereby the loin knife and scribe saw assemblies would be stepped through a representative cycle using a typical pork side. The position of each servo would be individually controlled and recorded for each position of the platen. Then, once the entire range of datapoints were stored, the resulting profile could be "smoothed out" by a known curve-fitting algorithm. Moreover, empirical data may alternatively be obtained for different sizes and shapes of pork sides to generate additional profiles for building a database of profiles for selection by a best fit algorithm.

Returning to block 216 in FIG. 11, the profile data for servos 152, 154, 156 and 157 are preferably dynamically modified to control the left side of the knife blade to better follow a fixed separation from the fat/lean separation line of the pork side.

The dynamic profile modification routine in block 220 preferably periodically checks the position of the fat/lean separation line at a fixed position in front of knife blade 121 (i.e., a position on the pork side prior to its being cut by loin knife assembly 100). Since this position occurs prior to the loin pulling operation, the routine in block 220 may not be active for the loin separation operations.

Controller 172 utilizes imaging system 190 to provide offset data dynamically for correcting the loin knife assembly profile. First, controller 172 commands imaging system 190 to capture an image of the fat/lean separation line with fat line camera 198. Then, the captured image is image processed, typically through noise reduction, thresholding and convolution, to generate the fat/lean separation line. The lateral position of the fat/lean separation line at a particular platen position index value may be calculated, for example, by determining the X coordinate of the fat/lean separation line in the processed image at the appropriate Y coordinate corresponding a known fixed position from the loin knife blade.

An appropriate position for the left side of the knife blade may be calculated for the particular platen position being processed using the lateral position data generated from the processed image described above. This value is compared to the actual profile data for the left side of the knife blade from the profile data stored for servos 152, 154, 156 and 157, and if the actual value is outside of an acceptable range (i.e., greater than about a one percent deviation), the profile data points for servos 152, 154, 156 and 157 for the remainder of the profile data points are preferably modified to shift the left side of the knife blade over a distance equal to the difference between the prior profile and that calculated dynamically as described above.

It will be appreciated that other modifications may be made to the preferred dynamic routine 220 consistent with the invention. For example, using suitable pattern matching, the preferred routine may be used to detect protrusions of the backbone into the fat cover, which could otherwise obstruct the knife blade as it passes along a normally calculated profile. As above, the profiles of the servos 152, 154, 156 and 157 may be modified to shift the left side of the knife blade to clear a detected protrusion. This may be accomplished by modifying the profile data points immediately proximate the protrusion, or alternatively, by shifting all of the profile data points remaining after the protrusion, and allowing the profile data points to be shifted back in later iterations when the protrusion is no longer detected by the routine.

The invention therefore provides a loin separation apparatus which offers precise and efficient control over scribing and loin pulling operations utilizing highly controllable scribe saw and loin knife assemblies. The multiple axes of control for the assemblies, and the use of controllable motion and imaging systems, further offers significant sophistication, flexibility and expandability in controlling these operations. As one skilled in the art will appreciate that various modifications may be made to the preferred embodiments without departing from the spirit and scope of the invention, the invention thus resides in the claims hereafter appended.

What is claimed is:

1. In a loin separation apparatus, a scribe saw assembly comprising:

(a) a steering coupling;

(b) scribe saw moving means for moving the steering coupling along a lateral axis relative to the loin separation apparatus;

(c) a saw blade mounting assembly, pivotally mounted to the steering coupling at a forward point thereon to rotate about a vertical axis, including a saw blade and drive means for rotating the saw blade;

(d) height adjustment means, coupled to the saw blade mounting assembly, for automatically controlling the cutting depth of the saw blade; and (e) a controller, coupled to the drive means and the scribe saw moving means, for controlling movement of the scribe saw assembly to scribe ribs on a side of meat as the side of meat is conveyed through the loin separation apparatus.

2. The assembly of claim 1, further comprising locking means for locking the saw blade mounting assembly in a fixed position with respect to the steering coupling.

3. The assembly of claim 1, further comprising second scribe saw moving means for raising and lowering the scribe saw head assembly.

4. The assembly of claim 3, wherein the controller includes means for actuating the drive means and the first and second scribe saw moving means to control the scribe saw head assembly to follow a profile.

5. The assembly of claim 4, wherein the controller further includes imaging means for generating a top plan image of the side of meat, image processing means for determining a backbone line from the top plan image, and profile calculating means for generating profiles for the first and second scribe saw moving means to control the scribe saw head assembly to scribe the ribs at a preset distance from the backbone line.

6. The assembly of claim 5, wherein the image processing means determines the location of a last rib on the side of meat, and wherein the controller deactivates the drive means, and activates the second scribe saw moving means to raise the scribe saw head assembly, at a fixed distance from the last rib.

* * * * *